US012775460B1

(12) United States Patent
Conger et al.

(10) Patent No.: US 12,775,460 B1
(45) Date of Patent: Oct. 27, 2026

(54) CACHED REPOSITORY SYNCHRONIZATION AND SNAPSHOT REUSE FOR AGENTIC SOFTWARE CONTAINERS

(71) Applicant: OpenAI OpCo, LLC, San Francisco, CA (US)

(72) Inventors: Channing Conger, San Francisco, CA (US); Maxwell Johnson, San Francisco, CA (US); Hantao Wang, San Francisco, CA (US)

(73) Assignee: OpenAI OpCo, LLC, San Francisco, CA (US)

( * ) Notice: Subject to any disclaimer, the term of this patent is extended or adjusted under 35 U.S.C. 154(b) by 0 days.

(21) Appl. No.: 19/388,725

(22) Filed: Nov. 13, 2025

(51) Int. Cl.
*G06F 8/71* (2018.01)

(52) U.S. Cl.
CPC .................................. *G06F 8/71* (2013.01)

(58) Field of Classification Search
CPC ................................................ G06F 8/71
USPC ................................ 717/120–123, 168–173
See application file for complete search history.

(56) References Cited

U.S. PATENT DOCUMENTS 7,209,933 B2 * 4/2007 Saxena .................... G06F 8/71 707/999.203
10,204,112 B1 * 2/2019 Bhargava ............ G06F 16/2329
2008/0201330 A1 * 8/2008 Bloesch .................... G06F 8/71
2025/0259041 A1 * 8/2025 Crabtree ................ G06N 3/047
2025/0259043 A1 * 8/2025 Crabtree ................ G06N 3/047
2025/0259047 A1 * 8/2025 Crabtree ................ G06N 5/022

OTHER PUBLICATIONS

Podobnik, "Building Container Images: Best Practices, Considerations, and In-Depth Insights", 2023, retrieved from https://levelup.gitconnected.com/building-container-images-best-practices-considerations-and-in-depth-insights-44581b0323ff , 9 pages. (Year: 2023).*
Michael Ernst, "Version control concepts and best practices", 2024, retrieved from https://homes.cs.washington.edu/~mernst/advice /version-control.html , 10 pages. (Year: 2024).*
Janakiram MSV, "AI Agents vs. Agentic AI: A Kubernetes Developer's Guide", Sep. 2025, retrieved from https://thenewstack.io/author/ janakiram/ , 7 pages. (Year: 2025).*

* cited by examiner

*Primary Examiner* — Ted T. Vo
(74) *Attorney, Agent, or Firm* — Polsinelli PC

(57) ABSTRACT

Systems and techniques are described herein for cached repository synchronization and snapshot reuse for agentic software containers. For example, a method includes: receiving a request associated with an agentic software development task associated with a code repository; determining whether the code repository is cached in a local data store; obtaining the code repository based on whether the code repository is cached in the local data store; copying the code repository into a container for the software development task; and obtaining a modified version of the code repository based on changes an AI model made to the code repository based on the software development task.

20 Claims, 13 Drawing Sheets

CACHED REPOSITORY SYNCHRONIZATION AND SNAPSHOT REUSE FOR AGENTIC SOFTWARE CONTAINERS

BACKGROUND

Generative response engines such as large language models represent a significant milestone in the field of artificial intelligence, revolutionizing computer-based natural language understanding and generation. Generative response engines, powered by advanced deep learning techniques, have demonstrated astonishing capabilities in tasks such as text generation, translation, summarization, and even code generation. Generative response engines can sift through vast amounts of text data, extract context, and provide coherent responses to a wide array of queries.

BRIEF DESCRIPTION OF THE SEVERAL VIEWS OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings, and the claims.

DETAILED DESCRIPTION

Figure 1:
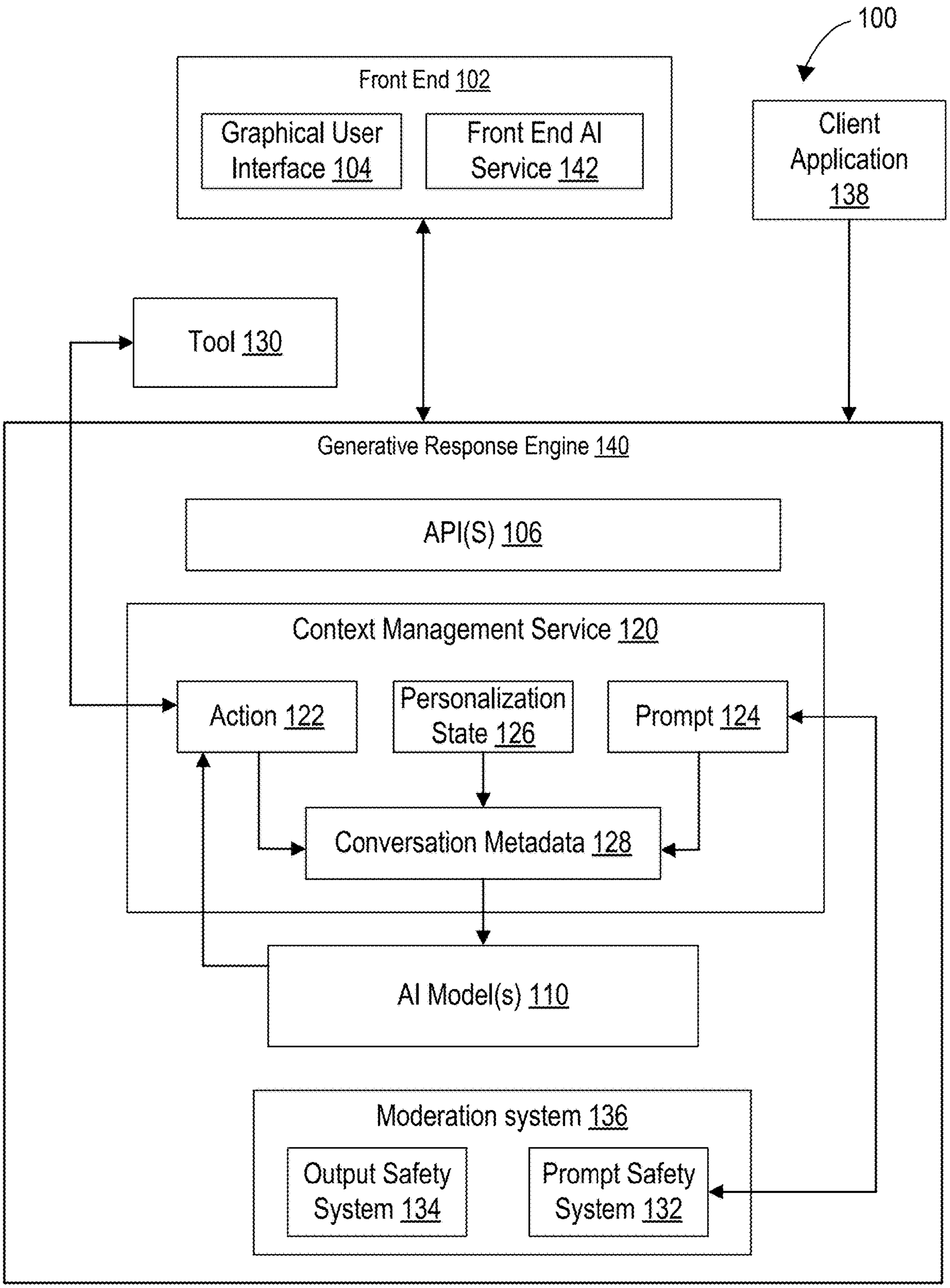
FIG. 1 illustrates an example system supporting a generative response engine during inference operations in accordance with some aspects of the disclosure.

Generative response engines such as large language models represent a significant milestone in the field of artificial intelligence, revolutionizing computer-based natural language understanding and generation. Generative response engines, powered by advanced deep learning techniques, have demonstrated astonishing capabilities in tasks such as text generation, translation, summarization, and even code generation.

Many generative response engines provide a conversational user interface powered by a chatbot whereby the user account interacts with the generative response engine through natural language conversation with the chatbot. Such a user interface provides an intuitive format to provide prompts or instructions to the generative response engine. In fact, the conversational user interface powered by the chatbot can be so effective that users can feel as if they are interacting with a person. Some user accounts find the generative response engine effective enough that they utilize the conversational user interface powered by the chatbot as they would an assistant.

One use of generative response engines is automated application development and software development functions to automate complex tasks, enhance productivity, and reduce manual errors. For example, generative response engines are driven by advanced artificial (AI) models and can interpret natural language specifications or high-level requirements and generate corresponding code, documentation, or configurations, which allow developers to focus more on architectural decisions and problem-solving rather than repetitive implementation details. As an example, a function that translates user stories into unit tests or skeleton code is important because it accelerates the development phase and also enforces consistency and test coverage from the outset. A generative engine can also automate the creation and maintenance of continuous integration (CI)/continuous deployment (CD) pipelines by writing instructions (e.g., YAML or JSON) files for workflows, and generating server deployment scripts tailored to specific cloud environments. Additionally, generative response engines can automate tasks such as database schema migrations, application programming interface (API) endpoint scaffolding, and server provisioning to streamline operations and reduce friction between development and operations teams. Generative response engines can contribute to documentation, generate performance monitoring scripts, and produce security checks. Despite these advantages, generative response engines require thorough oversight, including human review of generated code, robust automated testing, and continuous feedback loops to ensure maintainability, security, and scalability.

Containerized environments have become a common approach for deploying and managing machine learning (ML) workloads due to their portability, scalability, and consistency across heterogeneous hardware and software systems. Containers allow ML models and supporting software to be packaged with their dependencies and executed in isolated environments on shared infrastructure. This approach provides flexibility for distributed computing and resource sharing across clusters or cloud platforms. However, despite these advantages, containerized execution can introduce initialization delays, particularly when scaling rapidly or deploying large ML systems that consume significant data and model loading at startup. These delays can reduce responsiveness and throughput, especially in real-time inference or interactive AI systems.

One significant challenge in containerized ML workloads is the time delay associated with starting containers and initializing runtime environments. During startup, container orchestration systems (e.g., Kubernetes or Docker Swarm)

allocates compute resources, establish network connections, load models into memory, and synchronize with data sources. This startup latency can range from a few seconds to several minutes depending on the size of the model, container image, and storage configuration. Such delays can degrade user experience in low-latency applications and lead to inefficiencies in autoscaling environments, where containers are frequently created and terminated based on workload demand. In latency-sensitive deployments, the time consumed to initialize containers can therefore represent a performance bottleneck.

In addition to startup delays, the execution of ML workloads inside containers can also incur overhead due to resource contention, data movement, and inefficient scheduling. For example, when multiple containers share GPUs or memory bandwidth, context switching and memory allocation can become costly. Similarly, transferring large model weights and intermediate tensors between containers or across networked nodes can consume significant time and energy. These inefficiencies are further exacerbated when running transformer-based models or other deep architectures that depend on high-throughput, low-latency computation. Thus, optimizing container startup time, memory management, and resource utilization remains an important challenge in ensuring that containerized ML systems can operate efficiently at scale while maintaining low latency and high reliability.

Systems, apparatuses, processes (also referred to as methods), and computer-readable media (collectively referred to as "systems and techniques") are described herein for performing agentic software development tasks using containerized environments with locally cached code repositories. For example, an apparatus is configured to receive a request associated with an agentic software development task linked to a code repository and determine whether a version of the code repository is cached in a local data store. Based on this determination, the apparatus can obtain the code repository from the cache or retrieve it from a remote repository service. The obtained repository is then copied into a container environment that executes the requested software development task, where an artificial intelligence (AI) model modifies the code repository to generate a new or updated version of the software.

In some aspects, the system maintains synchronization between a locally cached version of the code repository and a remote version stored in a repository service. The synchronization process can include retrieving commits that represent differences (or deltas) between the cached repository and the remote repository, and applying the commits to update the local copy to the current version. Additionally, the system may implement time-based policies, wherein a timer expiration or a detected time difference triggers an automatic refresh of the cached repository from the repository service. This configuration allows the system to minimize redundant downloads, reduce startup latency during container initialization, and maintain consistency between cached and remote code repositories while conserving bandwidth and processing resources.

In some aspects, the system is configured to manage a pool of pre-initialized containers that each include cached versions of code repositories to further reduce the delay associated with container startup. Upon receiving a new agentic software development task, the system assigns the task to an available container from the pool and executes the task using the cached repository within that container. The AI model then modifies the code repository to produce a new version, which can be captured and stored for subsequent development tasks. Containers in the pool may be refreshed based on elapsed time since initialization or usage thresholds, ensuring that active containers remain synchronized with the latest repository state. This approach enables the system to maintain readiness for continuous software development operations, reduce latency in task execution, and improve overall computational efficiency in agentic development workflows.

FIG. 1 illustrates an example AI assistant service 100 supporting a generative response engine during inference operations in accordance with some aspects of the present technology. Although the example system depicts particular system components and an arrangement of such components, this depiction is to facilitate a discussion of the present technology and should not be considered limiting unless specified in the appended claims. For example, some components that are illustrated as separate can be combined with other components, and some components can be divided into separate components.

AI model(s) 110 are artificial intelligence (AI) models that can generate content in response to a prompt. The prompt can be from a human or a software entity (AI or applications, such as client application 138). The prompt is generally in natural language but could be in code, including binary. Some examples of AI model(s) 110 can include language models that generate language, such as CHATGPT, or other models, such as DALL-E or IMAGEGEN, which generate images, and SORA, which generates videos. CHATGPT, DALL-E, IMAGEGEN, and SORA are all provided by OPENAI, but AI model(s) 110 are not limited to AI provided by OPENAI. AI model(s) 110 can also be any type of generative AI and can include AI developed using various architectures such as diffusion models and transformers (e.g., autoregressive transformer architecture) and combinations of models. Some AI models are multi-modal models which can receive and output data in text, image, audio, etc.

In some instances, a language model, such as CHATGPT, can receive prompts to output images, video, code, applications, etc., which it can provide by interfacing with one or more other models, as will be addressed further herein.

AI model(s) 110 may be part of a generative response engine 140, where generative response engine 140 may include one or more components for supporting interaction with AI model(s) 110. Users can interact with generative response engine 140 through a front end 102 and applications can interact with generative response engine 140 through APIs 106. Front end 102 serves as the interface and intermediary between the user and generative response engine 140. It encompasses a graphical user interface 104 which may be used to provide input that facilitate communication with generative response engine 140 and AI model(s) 110. Generally, users interact through a graphical user interface 104 that often includes a conversational interface, and applications interact through the API 106, but this is not a requirement.

While some components are shown as being part of generative response engine 140 and some are outside of generative response engine 140, this is for illustration purposes and some components such as tool 130 might be part of generative response engine 140, and some components such as moderation system 136 might be outside of generative response engine 140. As used herein, generative response engine 140 encompasses deterministic services that are first-party services that prepare prompts to be sent to AI models, that are primitive level services that AI model(s) 110 can utilize to generate a response to a prompt. Services that are outside of generative response engine 140 are logically separate. For example, front end 102 might be a first-party front end (provided by the same party that provides generative response engine 140) but front end 102 is used to interface with generative response engine 140 rather than aid in developing a response to a prompt.

Some components of generative response engine 140 might be executed by computing programming units (CPU), and some components might be executed by graphical processing units (e.g., AI model(s) 110).

In some embodiments, client application 138 might provide a graphical user interface that is custom to client application 138 or can display graphical user interface 104 provided by generative response engine 140 provider.

Graphical user interface 104 is the platform through which users interact with the generative response engine 140. It can be a web-based chat window, an application, or any interface that supports data input and output. Graphical user interface 104 facilitates a conversation between the user and AI model(s) 110, as the user provides prompts in graphical user interface 104 to which AI model(s) 110 respond, and generative response engine 140 presents those responses in graphical user interface 104. In some aspects, graphical user interface 104 presents a conversational interface, which has attributes of a conversation thread between a user account and AI model(s) 110.

Graphical user interface 104 is configured to perform input handling and output presentation. The type of inputs that can be received can be relative to the specifics of generative response engine 140 and/or AI model(s) 110. For example, a language model is generally configured to accept text, but when the AI model is a multi-modal AI model, front end 102 can accept voice and images/video.

In some aspects, front end 102 can be a layer to accept any inputs, provide the inputs to generative response engine 140, receive outputs from generative response engine 140 and display the outputs. Graphical user interface 104 can accept any input types as part of the prompt, and front end AI service 142 can determine which AI model or collection of AI models are best suited to respond to the prompt. Front end AI service 142 can be one or more AI models that can be trained to determine which AI model should be used to respond to a prompt, and in some examples, can be used to improve prompts or provide additional configuration details, such as how long a reasoning model should spend processing a prompt. In general, front end AI service 142 can support functions of graphical user interface 104 by performing interference operations before a prompt is sent to generative response engine 140. Generally graphical user interface 104 is present on a client device, while front end AI service 142 might be present on the same client device or on a server in a data center.

Graphical user interface 104 is also configured to maintain the context of the conversation, which allows for coherent and relevant responses. For example, graphical user interface 104 is responsible for providing the conversation thread and other relevant context accessible to the front end 102 to the AI models along with the specific prompt. In an example, a conversation between the user account and the AI model(s) 110 can have taken several turns (prompt, response, prompt, response, etc.). When the user account provides a further prompt, the graphical user interface 104 can provide that prompt to AI model(s) 110 in the context of the entire conversation.

In another example, graphical user interface 104 might be configured to provide a system prompt along with a user-provided prompt. A system prompt is hidden from the user account and is used to set the behavior and guidelines for the AI model. The system prompt can be used to define the AI's persona, style, and constraints. There can be levels of system prompts. A highest level of a system prompt might be provided by the AI model(s) 110 provider and is meant to establish policies for the behavior of AI model(s) 110. This highest level of system prompt should be prohibited from being edited. A customization system prompt can be used to customize the behavior of the AI model and is often provided through an API call, or provided by a user account when creating a customized version of AI model(s) 110. A still lower level of system prompt might include hidden information about a task. This can include chain-of-thought from a reasoning model, or context about an application that AI model(s) 110 is working with to complete a task. Accordingly, graphical user interface 104 does not display all of the output of the AI model.

Graphical user interface 104 is also configured to display the responses from the AI model, which might include text, code snippets, images, or interactive elements.

In some aspects, AI model(s) 110 can provide instructions to front end 102 that instruct graphical user interface 104 about how to display some of the output from the AI model. For example, the AI model and/or generative response engine can direct graphical user interface 104 to present code in a code-specific format, or to present interactive graphics, or static images. In other examples, the AI model and/or generative response engine can direct graphical user interface 104 to present an interactive document editor where graphical user interface 104 can be presented with the document editor so that the user account and the AI model can collaborate on the document.

In some aspects, AI model(s) 110 can provide instructions to personalization state 126 to record facts in a personalization notepad. Personalization state 126 can store information received directly from the user account or inferred from prompts provided by the user account, and can be used to provide context to the AI model such that output is personalized for the user account. In some examples, front end 102 can be configured to notify the user account that a memory was created. Personalization state 126 can also include summaries of past conversation threads between the user account and the generative response engine 140, and/or a searchable index of past conversation threads. In this way, personalization state 126 aid generative response engine 140 and/or AI model(s) 110 to learn specific facts about a user account and recall past interactions. The past interactions can be used to guide future responses by generative response engine 140 and/or AI model(s) 110 such that generative response engine 140 and/or AI model(s) 110 becomes personalized to a particular user account.

Generative response engine 140 can provide one or more application programming interfaces (API(s)) 106. APIs enable developers to integrate the AI model's capabilities into external applications and services. APIs 106 provide programmatic access to generative response engine 140, allowing for customized interactions and functionalities. While APIs 106 are shown as part of generative response engine 140, in some examples, APIs 106 are part of front end 102. API 106 can refer to points of access to AI model(s) 110. In some examples, API 106 endpoints are located at context management service 120.

APIs 106 can accept structured requests containing prompts, context, and configuration parameters. For example, an API can be used to provide prompts and divide the prompt into system prompts and user prompts. In some aspects, APIs 106 can provide specific inputs for which AI model(s) 110 are configured to respond with a specific behavior. For example, an API can be used to specify an output in a particular format or structured output. For example, in the chat completion API, the API call can specify parameters for the output, such as the max length for the desired output, and specify aspects of the tone of the language used in the response. The output can also be structured output and in a data interchange format such as JavaScript object notation (JSON). For example, the input query may include a schema that identifies a specific output structure. Some common APIs are for participating in a conversation (Chat Completion API), for providing a single response (Completion API), for converting text into embeddings (Embeddings API), etc. The API can also be used to indicate specific decision boundaries that AI model(s) 110 might be trained to interpret. For example, the moderation API can take advantage of AI assistant service 100's content moderation decision-making. In the case of the moderation API and others, the API might give access to services other than the AI model. For example, the moderation API might be an interface to moderation system 136, addressed below.

Some other common APIs include the Fine-Tuning API, which allows developers to customize AI model(s) 110 of generative response engine 140 using their own datasets; the Audio and Speech APIs, which cause AI model(s) 110 to output speech or audio; and the Image Generation API, which causes AI model(s) 110 to output images (which may request operations of other models).

There can also be APIs that direct AI model(s) 110 and/or generative response engine 140 to interface with other applications or other generative AI engines. In such cases, the specific application or AI engine might be specified, or AI model(s) 110 might be allowed to choose another application of generative response engine 140 to use in response to a prompt.

As described herein, a Responses API can be an improved API for interacting with AI model(s) 110. Responses API can take as a parameter a response identifier, which can be used to return AI model(s) 110 to a state that the model was in at a particular response, thereby allowing a user account or developer to recall a previous context without having to re-prompt AI model(s) 110 or having to replicate a previous series of prompts. Further, Responses API can facilitate function/tool chaining to enable execution of operations requiring several function/tool calls without the added overhead of responding to an API caller to call the function or tool. Instead, deterministic code associated with the API can be directed to call functions or tools (including other AI models) on behalf of the AI model, and return data resulting from the function or tool call to the AI model.

In short, graphical user interface 104 and APIs 106 can be used to provide prompts to AI model(s) 110 of generative response engine 140. Prompts are sometimes differentiated into prompt types. For example, a system prompt can be a hidden prompt that sets the behavior and guidelines for the generative response engine. A user prompt is the explicit input provided by the user, which may include questions, commands, or information.

Generative response engine 140 may also include a context management service 120. The function of context management service 120 is to manage and organize the flow of data among key subsystems, enabling AI model(s) 110 to generate responses that are contextually relevant, accurate, and enriched with additional information as required.

Action 122 facilitates auxiliary tasks that extend beyond basic text generation. In some aspects, action 122 can be actions that correspond to an API 106. In some aspects, action 122 can be agentic actions that AI model(s) 110 decide to take to carry out a user's intent as described in the prompt. For example, an action can be to call tool 130 or even other AI model(s) 110. Tools 130 can include internet browsers, editors such as code editors, other AI tools, etc. While tools are shown outside of generative response engine 140, some tools might be part of generative response engine 140 and some tools might be external tools.

Prompt 124 is the request or command provided by the user account through front end 102. In some aspects, prompt 124 can be further supplemented by a system prompt and other information that might be included by graphical user interface 104 or API 106 or associated with a custom AI model. In some aspects, prompt 124 can be modified or enhanced by AI model(s) 110 as addressed further below. Additionally, as the user account provides prompts and AI model(s) 110 provide responses, a conversation thread forms. As the user account provides a new prompt, this is appended to the overall conversation and added to prompt 124. Thus, a user account might think of a first user-provided message as a first prompt and a second user-provided message as a second prompt, and so on, but prompt 124 as perceived by AI model(s) 110 can include a thread of user-provided messages and responses from AI model(s) 110 in a multi-turn conversation. The actors in the conversation thread can be labeled so that AI model(s) 110 can review the turns of the conversation. Generally, prompt 124 will include an entire conversation thread, but in some instances, prompt 124 may be shortened if it exceeds a maximum accepted length (generally measured by a number of tokens).

In some examples, context management service 120 can also route prompts and responses through moderation system 136. In some aspects, prompts are provided to prompt safety system 132 before being provided to AI model(s) 110. Prompt safety system 132 is configured to use one or more techniques to evaluate prompts to ensure a prompt is not requesting AI model(s) 110 to generate moderated content. In some aspects, prompt safety system 132 can utilize text pattern matching, classifiers, and/or other AI techniques.

Since prompts can evolve over time through the course of a conversation, consisting of prompts and responses, prompts can be repeatedly evaluated at each turn in the conversation.

Personalization state 126 can facilitate continuity and personalization in conversations. It allows the system to maintain user-specific context, preferences, or details that may inform future interactions. Personalization state 126 can include a memory file of persisted data from previous interactions or sessions that provide background information to maintain continuity. In some aspects, information can be recorded to personalization state 126 at the instruction of AI model(s) 110 when AI model(s) 110 identify a fact or data that it determines should be saved in memory because the fact and/or data might be useful in later conversations or sessions. In some aspects, personalization state 126 can also include synthesized concepts extracted from past conversation threads, and personalization state 126 can also encompass the ability of AI model(s) 110 to search through past interactions to find relevant information to a current conversation thread.

Conversation metadata 128 can aggregate data points relevant to the conversation, including user prompt 124, action 122, and personalization state 126. This consolidated information package serves as the input for AI model(s) 110. Conversation metadata 128 can label parts of a prompt as user-provided, AI model-provided, a system prompt, personalization state 126, data from action 122 or tool 130 (addressed below).

AI model(s) 110 are the core engines that process inputs (from context management service 120) and generate outputs. In some aspects, AI model(s) 110 may be a generative transformer, or autoregressive transformer, but could use other architectures. In some examples, the transformer is multi-modal transformer that can use audio tokens (or embeddings thereof), visual tokens (or embeddings thereof), and language (or embeddings thereof) as needed.

A core feature of AI model(s) 110 is to generate content in response to prompts. The prompt can be from client application 138 provided via graphical user interface 104. AI model(s) 110 can be configured to receive inputs via APIs 106 that provide guidance on a desired output. AI model(s) 110 can analyze the input and identify relevant patterns and associations in the data, and generate a sequence of tokens that are predicted as the most likely continuation of the input. AI model(s) 110 generate responses by sampling from the probability distribution of possible tokens, guided by the patterns observed during its training. Two features of the autoregressive transformer that result in this functionality are that the autoregressive transformer might use the decoder part of the transformer architecture and that it utilizes self-attention. By using the decoder part of the transformer architecture, the transformer focuses on predicting the tokens given the previous context tokens. The self-attention mechanism captures long-range dependencies amongst tokens, allowing it to generate contextually relevant responses (in text, audio, images, and video).

In some aspects, AI model(s) 110 can generate multiple possible responses before presenting the final one. AI model(s) 110 can generate multiple responses based on the input, and these responses are variations that AI model(s) 110 consider potentially relevant and coherent.

In some aspects, AI model(s) 110 can evaluate generated responses based on certain criteria. These criteria can include relevance to the prompt, coherence, fluency, and sometimes adherence to specific guidelines or rules, depending on the application. Based on this evaluation, AI model(s) 110 can select the most appropriate response. This selection is typically the one that scores highest on the set criteria, balancing factors like relevance, informativeness, coherence, and content moderation instructions/training.

In some aspects, an instruction provided by an API 106, a system prompt, or a decision made by AI model(s) 110 can cause AI model(s) 110 to interpret a prompt and re-write it or improve the prompt for a desired purpose. For example, AI model(s) 110 can determine to take a prompt to make a picture and enhance the prompt to yield a better picture. In these instances, AI model(s) 110 can generate their own prompts, which can be provided to tool 130 or provided to AI model(s) 110 to yield a better output response than the original prompt might have.

AI model(s) 110 can also do more than generate content in response to a prompt. In some aspects, AI model(s) 110 can use decision boundaries to determine the appropriate course of action based on the prompt. In some examples, a decision boundary might be used to cause the AI model to recognize that it is being asked to provide a response in a particular format such that the AI model will generate its response constrained by the particular format. In some examples, a decision boundary can cause the model to refuse to generate a responsive output if the decision is that the responsive output would violate a moderation policy. In some examples, the decision boundary might cause the AI model to recognize that it interfaces with another AI model or application to respond to the prompt. For example, when the AI model is a language model, it might recognize that it is being asked to output an image, and therefore, it interfaces with a model that can output images to provide a response to the prompt. In another example, the prompt might request a search of the Internet before responding. The AI model can use a decision boundary to recognize that it should conduct a search of the Internet and use the results of that search in responding to the prompt. In another example, the prompt might request that the AI model take an agentic action on behalf of the user by interacting with a third-party service (e.g., book a reservation for me at . . . ), and the AI model can use a decision boundary to recognize that it should plan steps to locate the third-party service, contact the third-party service, and interact with the third-party service to complete the task and then report back to the user that the action has been completed.

When AI model(s) 110 determine to take an agentic action on behalf of the user or to call a tool to aid in providing a quality response to the user account, AI model(s) 110 might call a tool 130 or cause an action 122 to be performed. As indicated above, tools 130 can include internet browsers, editors such as code editors, other AI tools etc. Actions 122 are actions that AI model(s) 110 can cause to be performed, perhaps using tool 130. As used herein actions 122 should be considered to cover a broad array of actions that AI model(s) 110 can perform with or without tools 130. Tools 130 are considered to cover a wide variety of services and software that encompass tools such as a computer operating system such that AI model(s) 110 can control the computer operating system on the user's behalf, to robotic actuators, to search browsers and specific applications.

Additionally, AI model(s) 110 can also generate portions of responses that are not displayed to the user. For example, AI model(s) 110 can direct front end 102 to provide specific behaviors, such as directions for how to present the response from AI model(s) 110 to the user account. In another example, AI model(s) 110 can provide response portions dictated by APIs 106, where portions of the response to the API might be for the consumption of the calling application but not for presentation to the end user. In another example, some AI model(s) 110 are reasoning models, which are AI model(s) 110 that are configured to output a raw chain-of-thought before preparing a final response to a prompt. The raw chain-of-thought might not be presented to a user account or application calling an API. Instead, another AI model might summarize the raw chain-of-thought into a more consumable and useful output for the user account or application.

In some aspects, the output of the AI model can be further analyzed by output safety system 134. While AI model(s) 110 can perform some of their own moderation, there can be instances where it is beneficial to have another service review outputs for compliance with a moderation policy. The use of dashed lines in FIG. 1 differentiates a path using output safety system 134 and not using output safety system 134.

As used herein, the present description may refer to the generative response engine or AI model(s) making a determination or reasoning prior to providing a response to a prompt. Determining can refer to a process by which an AI model outputs a response that provides a conclusion. In an example, an AI model can perform an inference operation to output a sequence of tokens, which output provides a determination. In such an example, the AI model might not have made any decision other than to sample particular tokens to provide an output, yet the response from the AI model might be a statement of determination. In another example, AI models can be trained to make particular determinations. In such examples, the AI model can be trained to make a decision, such as to cross a decision boundary to take an agentic action or to call a tool, etc.

Reasoning refers to simulating logical processes to draw conclusions or perform tasks based on provided inputs and learned information. Modern reasoning models often employ chain-of-thought (CoT) mechanisms by generating intermediate steps before producing a final answer. These steps mimic human logical progression by breaking a problem into sub-problems, applying learned associations, and carrying forward intermediate conclusions. In this way, the reasoning model leverages its statistical training to maintain coherence across steps, identify relevant patterns, and predict outcomes that align with structured reasoning.

Figure 2:
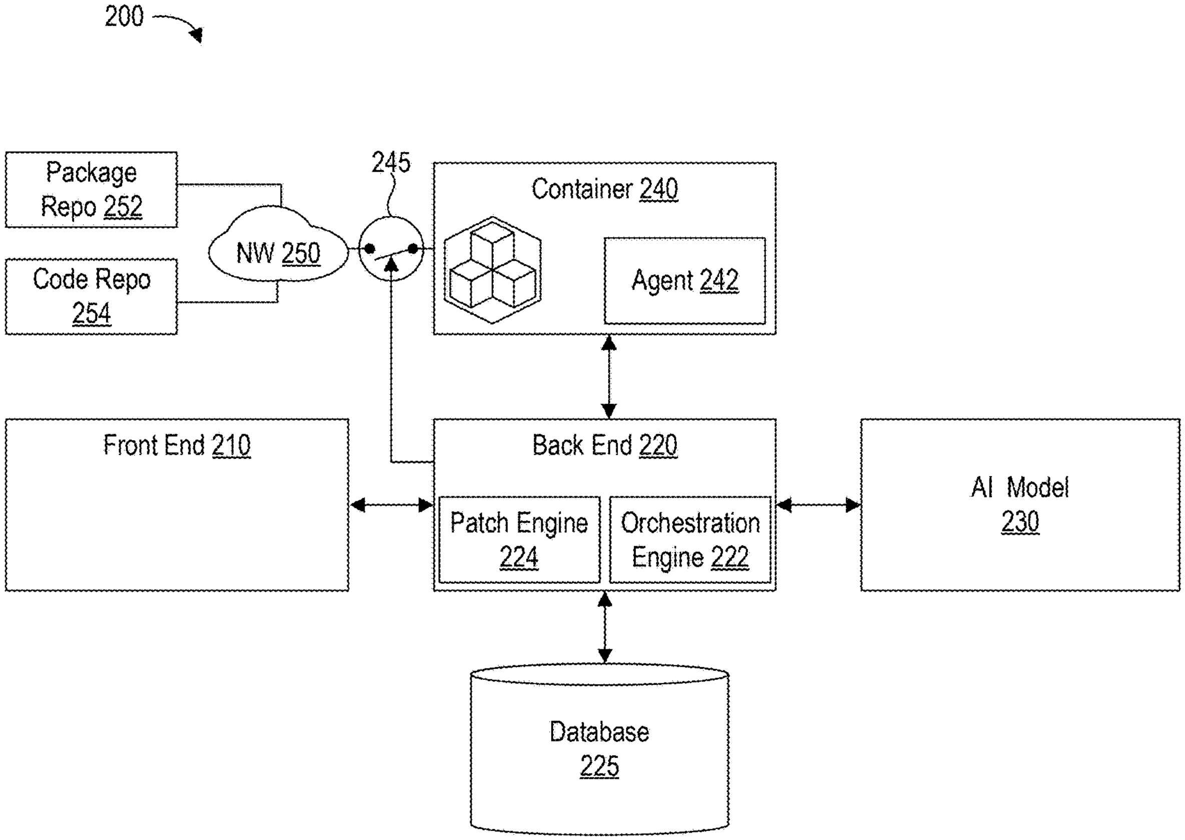
FIG. 2 is a conceptual block diagram of an automated software development system using a generative response engine in accordance with some aspects of the disclosure.

FIG. 2 is a conceptual block diagram of an automated software development system 200 using a generative response engine in accordance with some aspects of the disclosure. In some aspects, automated software development system 200 includes components of a generative response engine such as a front end 210 (e.g., front end 102), back end 220, and AI model 230 (e.g., a transformer-based model, etc.).

In some aspects, AI model 230 is a foundation model, which is a large-scale, pre-trained model built on vast and diverse datasets, designed to generalize across a wide range of downstream tasks such as language understanding, code generation, image analysis, and more. Foundation models leverage transfer learning to adapt efficiently to new problems with minimal additional training. An example of a foundation model is a reasoning foundation model that uses chain-of-thought reasoning in which the model generates intermediate logical steps to arrive at a final answer. This process mimics human problem-solving by structuring the reasoning path, which improves both the accuracy and interpretability of the model's outputs. In some cases, the foundation model can be fine-tuned for specific tasks, such as software development, and the model can be pruned to reduce weights and its ability to perform general-purpose reasoning, thereby using fewer computational resources and improving efficiency for targeted applications.

In some aspects, front end 210 can be a client application that is presented at an edge device and can be configured in various forms, such as a native application, a cross-platform application using a webview renderer (e.g., Electron, etc.), or a web browser instrumented application with instructions (e.g., a JavaScript bundle such as React or WebAssembly bytecode, etc.). In some cases, client application can be retrieved from cloud computing service (e.g., as a JavaScript bundle) or may be rendered via cloud computing service via different techniques (e.g., server-side rendering, partial hydration, etc.).

The back end 220 provides an interface for front end 210 to interact with various components on a server or cloud. For example, back end 220 includes various services such as database 225, inspection services to analyze the safety of prompts, and interface with AI model 230. Back end 220 includes orchestration engine 222 and patch engine 224 to implement software development services. Orchestration engine 222 is configured to receive instructions from front end 210 and spawn a container 240 including a development environment. In some aspects, edge devices (e.g., controlled by a user) can configure various aspects, such as an execution environment. The execution environment includes a base system (e.g., a Linux distribution) and can include instructions to build the base environment (e.g., a Docker file). The execution environment can also include additional instructions to instrument the development environment with various services, packages, package managers, servers, configurations, SDKs, and so forth. For example, the execution environment can include instructions to include a package manager (e.g., pip for Python, cargo for Rust, and npm for JavaScript, etc.) as well as various dependencies. As an example, a dependency can be a development tool (e.g., a linter for checking for errors before building, a prettier to consistently format code, etc.), a library for interacting with a database, a framework (e.g., React, etc.), a development package, and so forth.

Orchestration engine 222 receives various information from front end 210 including the execution environment and spawns container 240 including the development environment (not shown) and service 242.

In some aspects, container 240 has a lifecycle that is suitable for network applications. In particular, an instance of a container 240 is created, started, optionally paused, stopped, and eventually removed. At creation (e.g., docker create or docker run), container 240 is built from a specified image and includes an isolated environment, which contains the filesystem, environment variables, entrypoint, and network settings. When started, container 240 runs a defined process (e.g., in the dockerfile) with limited access to the host system. Container 240 is a sealed environment and can be accessed through services installed within the dockerfile. For example, access to container 240 (e.g., files, APIs, or other functionality) is provided via services installed and configured at build time (e.g., in the docker configuration or the dockerfile). After container 240 is executed, container 240 can be accessed via the defined services, and there is implicit access to its contents. Once the process ends, container 240 stops. Any changes made within container 240 (e.g., to the filesystem) are generally ephemeral and are lost when the container is stopped or removed.

In some aspects, container 240 may include service 242 that is configured to interact with AI model 230. For example, AI model 230 may be executing in specialized hardware for floating point operations (e.g., a graphical processing unit (GPU), a multiply accumulate (MAC) unit, etc.). The container 240 can expose a port to allow service 242 to interact with AI model 230 and perform functions associated with AI model 230. In some cases, various actions by AI model 230 can compromise the actions performed within container 240, such as attempting a denial of service attack, posting malicious social media content, and so forth. Even though container 240 is an isolated environment, it can be sealed from external access, and internal commands may be permitted. For example, container 240 may execute shell commands (e.g., curl, etc.) or other applications (e.g., ping, etc.) that can be accessed for various malicious purposes.

In some aspects, switch 245 is configured to permit or deny access to external network 250 by container 240. Switch 245 may be a logical network interface of container 240, and switch 245 is illustrated to show that back end 220 controls whether container 240 can access external network 250 (not the internal network). In some aspects, switch 245 can be enabled for an initialization period associated with configuring the container. In this case, container 240 can access network 250 to access package repository 252 during an initialization period associated with container 240. Package repository 252 can include various software packages, container images, and other components to generate and configure container 240. In some aspects, orchestration engine 222 is also configured to cause container 240 to access code repository 254 to locally clone a public or private repository. For example, orchestration engine 222 can access GITHUB (either using a public interface or a private repository based on a stored secret of the user) and retrieve and store code repository 254 within container 240.

Switch 245 may disable access to network 250 after all code and packages are installed in container 240 and the initialization period ends. For example, switch 245 is enabled before AI model 230 is provided access to service 242 of container 240 and is disabled when AI model 230 has access to service 242 of container 240. In this case, container 240 is unable to access external network 250 and the data, packages, code, and other content installed on container 240 can be accessed via an internal interface (e.g., a network file system service). In this way, container 240 cannot perform any malicious actions outside of its environment and any harmful activities are restricted to its environment. In some aspects, switch 245 can be configured using an internal interface (e.g., iptables in a Linux container) or an external interface (e.g., via a control plane associated with a container service).

In some aspects, switch 245 can be configured based on user control. For example, a user, as part of a project or an execution environment, may elect to enable limited or unlimited network access. For example, the user may configure container 240 to control the scope of network access via a configuration to restrict access to particular domains and protocols. For example, a user repository may be focused on implementing a new service based on an API (e.g., weather.acme.com), and internal and external network access can be limited to network traffic to and from that fully qualified domain name. In other examples, network access can be time-limited based on an external request to an external service, requiring a response within a duration (e.g., 5 seconds). In some cases, container 240 could include default configurations that identify advertent or inadvertent misbehavior, such as a loop that continues to execute an identical network request based on an improper configuration. Table 1 below illustrates an example of rules that can be applied to a firewall of container 240, such as a command-line utility iptables, which configures the packet filtering rules of the Linux kernel firewall.

TABLE 1

```
# Default policy: drop everything
iptables -P INPUT DROP
iptables -P OUTPUT DROP
iptables -P FORWARD DROP
# Allow loopback for local apps
iptables -A INPUT -i lo -j ACCEPT
iptables -A OUTPUT -o lo -j ACCEPT
# Allow incoming established connections (like replies)
iptables -A INPUT -m state --state ESTABLISHED, RELATED -j
ACCEPT
# Allow outgoing DNS (UDP port 53) to your resolver
iptables -A OUTPUT -p udp --dport 53 -j ACCEPT
# Resolve acme. com to IP (s)
# (Always resolve outside iptables, e.g., use 'dig' or 'nslookup')
ACME_IP=$ (dig +short acme. com | head -n 1)
# Allow outgoing traffic to acme.com IP on any port
iptables -A OUTPUT -d $ACME_IP -j ACCEPT
```

AI model 230 is configured to interact with service 242 of container 240 to generate code changes and other modifications within container 240 based on a natural language instruction. For example, service 242 can provide terminal access to AI model 230 (e.g., STDIN, STDOUT, STDERR) and allow AI model 230 to use the command line interface (CLI) to interact, read, and modify the copy of local code repository (e.g., cloned from code repository 254), run tests, and other developer functions. The service 242 can also include an interface that exposes an API to make modifications via commands that AI model 230 is trained with to provide discrete functions associated with a software development task. For example, AI model 230 can access a local GITHUB repository (e.g., the locally cloned repository within container 240) to create, read, update, and delete code files using an API. The AI model 230 behaves like an autonomous developer and reads code context, reasons about functionality or bugs, and produces inline edits, new code, and removes code as needed. The AI model 230 is able to perceive the entire context of the project while isolating changes to container 240.

Conventional automated development techniques either use direct access to a live system to directly modify files without network isolation (e.g., within a local development environment) and risk potential malicious behavior, or an incomplete understanding of the environment based on modification of a part of a repository within a web-based environment. For example, the local configuration can include various settings (e.g., a linter, a configuration file, etc.) and copying the code from a web-based front end may use additional modification to match the local development environment. For example, if the noImplicitAny flag is set to false in a local TypeScript configuration file and the code has implicit any return values, copying the changes from a web-based environment can create additional errors within the copied instructions based on differences in the local development environment and the web-based front end.

In some aspects, AI model 230 is configured to execute in a different hardware environment and can access service 242 to interact with the software development environment. For example, AI model 230 is typically executed at inference (e.g., at runtime) on specialized hardware, such as GPUs or custom accelerators, such as tensor processing units (TPUs), that are configured for large-scale matrix math. Machine learning (ML) inference and training involve massive parallel floating-point computations (e.g., matrix multiplications) that are faster on GPU hardware. For example, AI model 230 may benefit from high-throughput memory (e.g., high bandwidth memory (HBM)) and parallel processing cores that are not available in conventional CPU architectures.

Multiple instances of automated software development system 200 may execute in parallel to handle different tasks. For example, a first instance of automated software development system 200 may be adding database integration, a second instance of automated software development system 200 may be adding authentication, and a third instance may be adding a new feature.

After the task by AI model 230 is completed, orchestration engine 222 is configured to use service 242 to extract the development data associated with the task, which includes modifications, commands, changes, and any events that occurred within container 240 while being controlled by AI model 230. Orchestration engine 222 stores the development data in database 225.

Patch engine 224 is configured to access the development data extracted by orchestration engine 222 and generate a change proposal associated with code repository 254. For example, patch engine 224 can run commands to deterministically produce a diff of all the changes made within the development data. In some cases, patch engine 224 may be configured to receive the development data and identify the various changes (e.g., using a deterministic diff) and store the modifications in database 225.

In some aspects, AI model 230 can generate and output the diff to database 225. For example, AI model 230 can call a deterministic function. In some cases, AI model 230 may be able to reason and generate the diff during inference. In some cases, AI model 230 can also review the changes to validate that its reasoning corresponds to the generated instructions.

Patch engine 224 (or AI model 230) generates a diff that identifies a representation of changes (e.g., insertions, deletions) in a particular file. AI model 230 can be configured to output structured information using various techniques, such as a data validation function or library (e.g., zod) that validates data types that cross system boundaries. Table 2 below illustrates a diff command of two files (e.g., ./a/hello.txt and ./b/hello.txt) and a corresponding output format that identifies line-based changes (e.g., @@−1 +1,2 @@indicates to remove a line, and add two, followed by the lines to remove based on a leading "−" lines to add based on a leading "+").

TABLE 2

```
diff --git a/hello.txt b/hello.txt
index e69de29..a3c1234 100644
--- a/hello.txt
+++ b/hello.txt
@@ -1 +1,2 @@
-Hello world
+Hello world!
+Goodbye world.
```

In some aspects, automated software development system 200 is configured to generate a change proposal associated with code repository 254. For security purposes, automated software development system 200 may not be configured to directly access code repository 254 and can generate the change proposal for the user's review. The change proposal also includes additional information that can be used to generate all changes based on a state of code repository 254. For example, the change proposal can include a source branch containing proposed changes, a target branch where the changes are intended to be merged, a commit history that outlines the modifications, a diff showing line-by-line changes to files, and optional metadata such as a title, description, reviewers, and discussion comments for code review and collaboration. For example, a commit is a snapshot of a repository at a specific point and links to a tree of that snapshot. The commit includes a pointer to a tree object (e.g., a tree of files), a list of parent commits (for history), and other metadata (e.g., author, timestamp, commit message, etc.). The commit points to the new tree and the previous commit and allows a graph to be constructed to identify changes to be made out of order.

In some aspects, the change proposal, or at least parts of the change proposal and generated code, are provided to back end 220 based on user input. For example, front end 210 can display various options associated with the change proposal, such as the ability to view and generate a pull request. Based on the user input, back end 220 accesses database 225 and generates the change proposal.

Figure 3:
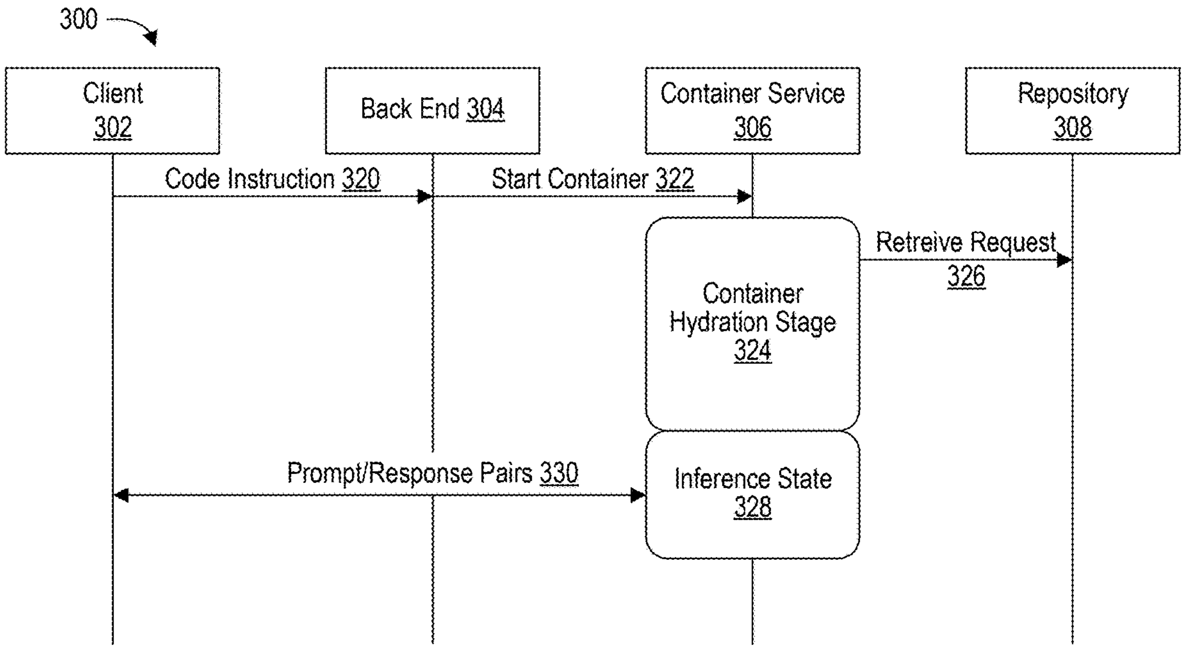
FIG. 3 illustrates a sequence diagram of a process for initializing a default container in accordance with some aspects of the disclosure.

FIG. 3 illustrates a sequence diagram of a process 300 for initializing a default container in accordance with some aspects of the disclosure. The system includes a client 302 (e.g., front end 210), a back end 304 (e.g., front end 210), a container service 306 (e.g., capable of spawning and controlling containers), and a repository 308 including the code to be modified or included. In some aspects, the repository 308 may also include package repositories, content distribution networks, and other features.

In some aspects, client 302 transmits a code instruction 320 that includes a natural language instruction to perform a specific coding task. In some cases, back end 304 can classify the task type and perform different startup processes. For example, for question and answer style requests, back end 304 can perform different container startup processes.

Back end 304 sends a start container 322 to container service 306, which provides instructions to start a new container from a generic container image. In typical deployments the host already holds a universal base image on disk and container service 306 does not fetch this base over the network during a normal start.

As soon as the container starts, container service 306 enters a hydration container stage 324 during which the container hydrates the environment. For example, during the hydration container stage 324, the container issues a retrieve request 326 to repository 308 to obtain the code, packages, and other required features associated with the natural language instruction. Hydration is the process of retrieving all necessary code, modules, and any other data necessary to achieve the code instruction 320. For example, the container may use a git request to retrieve the repository or clone the repository the operation can resemble a full clone. In some aspects, the container may also retrieve third-party libraries, install servers, install additional dependencies, and so forth. In this way, the hydration container stage 324 can take a non-trivial amount of time in which the container is being hydrated because the size of content can be massive in the multi-GB range.

After hydration finishes, container service 306 transitions to inference state 328 in which a machine learning model is allowed to interact with the container to perform functions associated with the code instruction 320. In some aspects, inference state 328 exchanges prompt/response pairs 330 with back end 304, which streams responses back to client 302. During retrieve request 326, a user provides instructions to the container, which then uses an AI model (not shown) to perform instructions associated with the repository within the container. In some aspects, the AI model may be configured to access the container through a terminal emulator that is exposed through the container service 306 (e.g., a docker exec command) and simulates the development process that a developer would use to modify the repository.

In some aspects, although not shown, process 300 (and any other process described below) also includes a patching process to apply the code generated by the AI model back into repository 308. In some cases, the process 300 may cause the back end 304 to generate a pull request based on the modifications and then submit the pull request to the repository 308. The pull request can be merged into the repository 308 based on different types of development processes (e.g., code review, etc.). In this way, process 300 allows a person to be in the development loop to review the changes generated by the AI model before submission into repository 308.

The process 300 enables an AI model to emulate a coordinated team of software developers within a controlled and auditable computing environment. Because the container lifecycle is fully managed by the container service 306, every action is performed by the AI model. For example, tasks such as source retrieval to code modification can be traced, logged, and replayed, and can improve transparency and reproducibility in the software development process by providing an auditable record of how the AI model generated or modified code. Process 300 allows enterprises to validate compliance, verify contributions, and ensure that AI model code evolution aligns with security and regulatory standards.

However, process 300 depends on a single generic container image that is customized dynamically during startup. In this case, the development environment is standardized rather than specialized. A standardized environment simplifies orchestration but limits the fidelity of environment-specific emulation. For example, certain projects use OS-specific frameworks, kernel extensions, or other platform-dependent features that cannot be reproduced in a Linux-based container. Because most container hosts are Linux-based for cost and compatibility reasons, the containers may not accurately simulate builds, dependency resolution, or execution that would occur in non-Linux environments, leading to reduced parity with real-world developer systems.

In addition, process 300 is a relatively slow operation due to retrieving and hydrating large repositories. The AI model relies on a fully initialized container to perform its task, and the slow startup times directly affect responsiveness. Extended startup latency diminishes the overall developer experience, particularly when a human user is collaborating with the AI model in real time. When the model makes incorrect assumptions or requires iterative guidance, a restart cycle compounds the delay, reducing productivity and increasing frustration and cognitive load. Further, repeated full-clone retrievals of large repositories can impose significant network and compute overhead, consuming bandwidth and storage resources across multiple container hosts. In large-scale deployments, this can result in congestion, resource contention, and increased operational cost. These inefficiencies become particularly acute in shared environments or during periods of high concurrency when multiple containers simultaneously perform full hydration operations.

Additionally, reliance on dynamic hydration at startup introduces variability and potential instability in the runtime environment. If repository dependencies change between startup events, two containers initialized at different times may experience inconsistent behavior, leading to nondeterministic results. This lack of determinism complicates debugging, validation, and reproducibility, which are key elements in an enterprise-grade software development pipeline.

Figure 4:
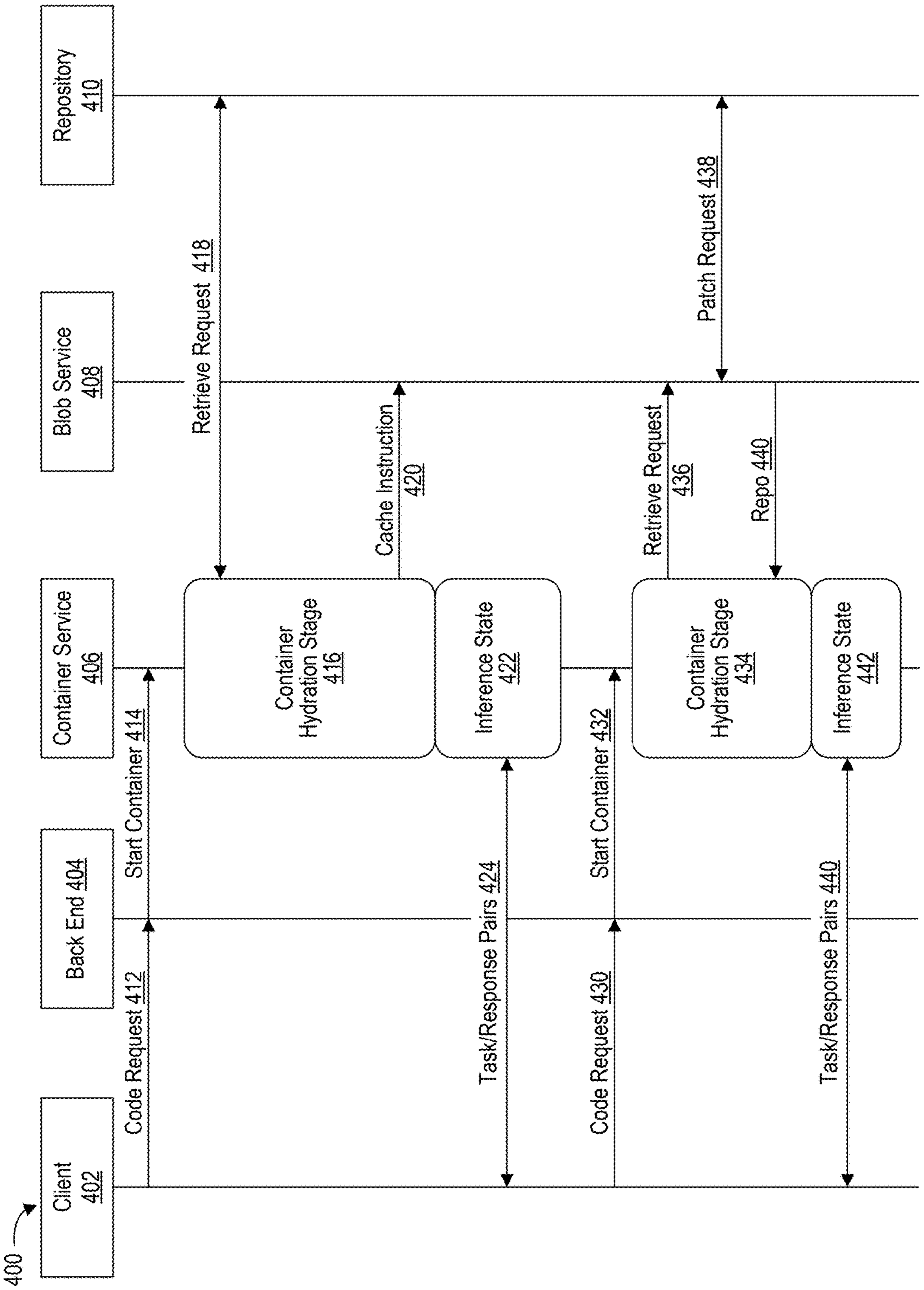
FIG. 4 illustrates a sequence diagram of a process for initializing a container using a cached repository in accordance with some aspects of the disclosure.

FIG. 4 illustrates a sequence diagram of a process 400 for initializing a container using a cached repository in accordance with some aspects of the disclosure. The system includes a client 402 (e.g., front end 210), a back end 404 (e.g., front end 210), a container service 406 (e.g., capable of spawning and controlling containers), a blob service 408 or other storage service, and a repository 410 including the code to be modified or included. In some aspects, the repository 410 may also include package repositories, content distribution networks, and other features.

In some aspects, client 402 transmits a code request 412 that includes a natural language instruction to perform a specific coding task. Back end 404 classifies the request and generates a start container command 414 that is transmitted to container service 406. In some cases, back end 404 can use an ML model (e.g., a classifier) to classify the request or the request itself may be instrumented with information to indicate it is a natural language request. In some aspects, the container service 406 spawns a new container from a universal base image (e.g., corresponding to FIG. 3) but can be hydrated using a cache-assisted process.

During a container hydration stage 416, container service 406 issues a retrieve request 418 to repository 410 to obtain source code, modules, and other relevant data. Similar to process 300, process 400 can retrieve a repository as well as additional information associated with the repository and the execution environment of the container (e.g., testing libraries, test data, third-party packages necessary to build the repository, development servers, server environments, etc.). In some cases, as part of the retrieval request, the container hydration stage 416 can also search for cached packages within the blob service 408 to reduce network load. For example, some packages are frequently requested, the blob service 408 may maintain multiple versions of the same package (e.g., a development server such as Vite, frameworks such as React, Go, etc.).

In some cases, the container service 406 also issues a cache instruction 420 to blob service 408, directing it to store packages associated with the retrieved repository (and other libraries). For example, the container service 406 can request the blob service 408 to store the repository associated with the user's request. The container service 406 may also request the blob service 408 to store associated contents such as third-party packages, servers, etc. The blob service 408 functions as a cluster-local storage service capable of retaining large repository artifacts for subsequent reuse. In other aspects, the blob service 408 may be used to store, the blob service 408 may be replaced by another type of storage system such as distributed object storage, network-attached storage, or database-backed archival systems.

Once the repository is hydrated, container service 406 transitions to inference state 422 for executing the natural language task. For example, an AI model may interact with the container to perform the requested code instruction. During inference state 422, task and response pairs 424 are exchanged between back end 404 and client 402, allowing the AI model to execute the task and stream results to the user interface of client 402. Once the task is completed, the container may the container is deprovisioned and its resources are released to allow other tasks to be performed. The container is ephemeral in that it is designed to exist for the duration of a specific task or session, after which it is deprovisioned and all associated state is discarded, ensuring isolation, scalability, and reproducibility across executions.

When client 402 later submits another code request 430 associated with the same or related repository, the container itself is unavailable and the process of reinitializing the container occurs again. For example, back end 404 transmits a start container 432 command to container service 406. During the subsequent container hydration stage 434, container service 406 performs a lookup within blob service 408 to determine whether a cache artifact exists for the associated repository. If a cache hit occurs, container service 406 issues a retrieve request 436 to the blob service 408 rather than performing a full clone from repository 410.

In some aspects, the cached instance within the blob service 408 may be behind a current. In this case, the blob service 408 (or the container service 406) may be configured to send a patch request 438 to retrieve a patch or a delta update associated with the repository. For example, changes can be made to repository 410 by an external source (not shown) between the cache instruction 420 and the patch request 438. In this way, the cached repository in blob service 408 can be updated to ensure that the container is representative of the repository 410. By performing a differential update using standard git-based protocols, the container downloads the delta between the cached commit and the most recent state of repository 410 and may substantially reduce startup latency, bandwidth consumption, and overall computational overhead. The container is then transitioned to inference state 442 in which task and response pairs 440 are exchanged, allowing the AI model to perform its functions with minimal delay.

Process 400 enables a caching mechanism that accelerates subsequent container startups and minimizes redundant network transfers. In some aspects, the cache in the blob service 408 can be refreshed periodically or on demand to ensure repository freshness while balancing storage utilization and operational cost. The cache mechanism can also enforce data residency and access controls, ensuring that authorized users may hydrate from or write to cached artifacts. Process 400 improves upon the default container initialization by leveraging cached repository snapshots to reduce startup times, improve responsiveness, and enhance the collaborative workflow between human developers and AI models, which reduces operational inefficiencies and improves determinism across multiple container instantiations.

Although process 400 improves performance by reusing cached repositories, it still exhibits certain technical limitations. For example, the cache artifacts stored in blob service 408 should be periodically refreshed to remain synchronized with repository 410. If the cache is not refreshed frequently, containers may initialize from stale repository versions, leading to outdated dependencies or missing commits. This condition can cause nondeterministic execution results or inconsistent build states, particularly when multiple developers or AI agents concurrently update the same repository.

Furthermore, maintaining large caches within blob service 408 introduces storage management and cost challenges. Cached repositories may include multi-gigabyte dependencies, compiled binaries, or large binary assets that consume significant storage resources. Without an intelligent eviction or prioritization policy, the cache may grow uncontrollably, resulting in increased operational costs and degraded performance of the blob service 408. In some aspects, cache eviction or expiration policies may inadvertently remove artifacts that are still in active use, resulting in additional latency when the system is forced to rehydrate from repository 410.

Another issue is data-access control and security constraints. Because cache artifacts represent snapshots of user repositories, the cache adheres to strict data-residency and permission requirements. Implementations that replicate data across multiple data centers may face compliance challenges, especially when repository data includes regulated or confidential code. Even with access-control mechanisms such as token-based authentication or scoped credentials, synchronizing authorization states between the cache and the source repository remains a complex task that can introduce transient inconsistencies. In some cases, network latency, transient failures, or mismatched versions can lead to partial or corrupted cache states. In such cases, a recovery procedure falls back to a full repository retrieval, negating the performance benefits of caching.

Figure 5:
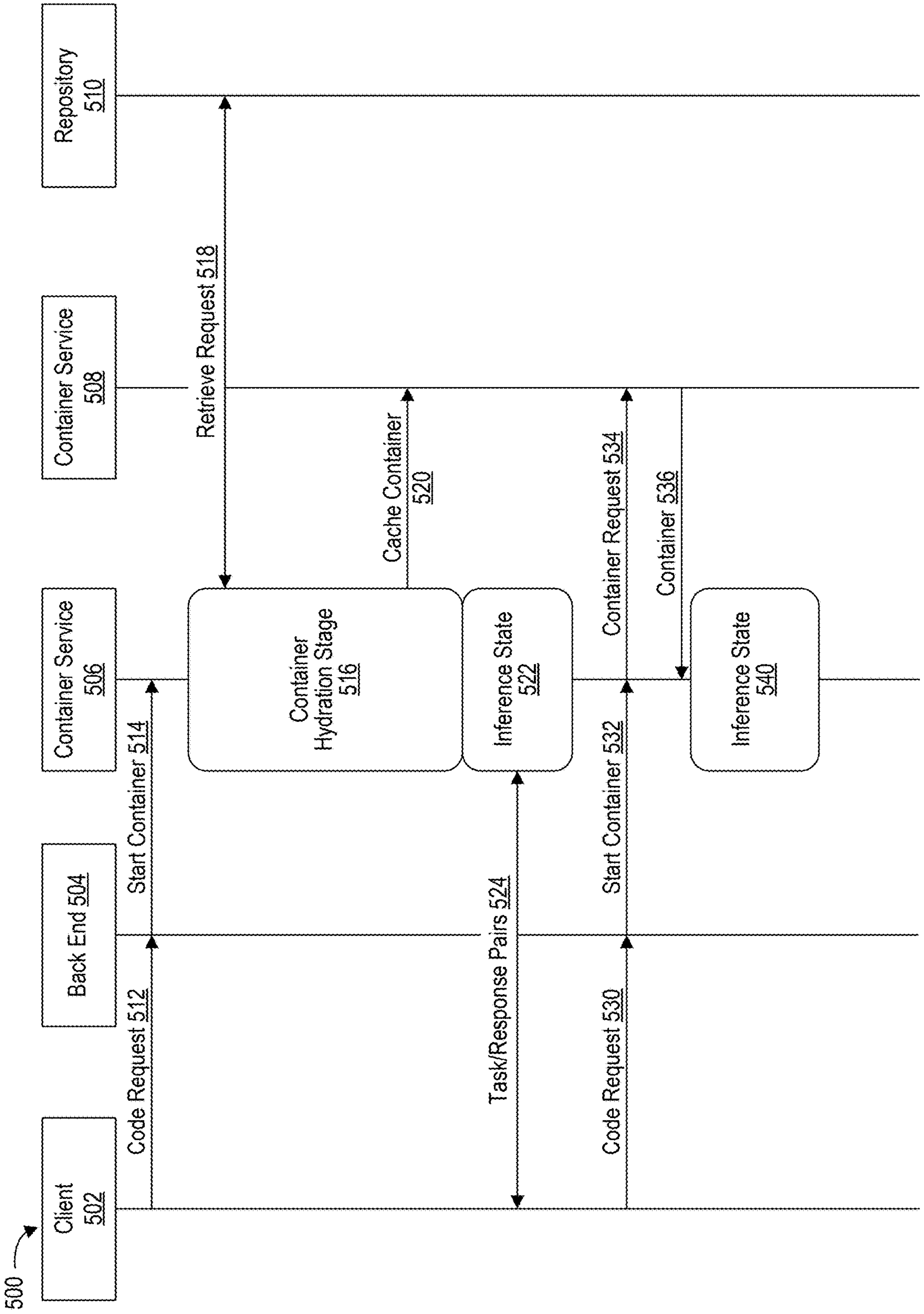
FIG. 5 illustrates a sequence diagram of a process for initializing a container using a snapshot of container images in accordance with some aspects of the disclosure.

FIG. 5 illustrates a sequence diagram of a process 500 for initializing a container using a snapshot of container images in accordance with some aspects of the disclosure. The system includes a client 502 (e.g., front end 210), a back end 504 (e.g., front end 210), a container service 506 (e.g., capable of spawning and controlling containers), a container storage 508 or other storage service, and a repository 510 including the code to be modified or included.

In some aspects, client 502 transmits a code request 512 including a natural language instruction to perform a coding task. Back end 504 determines that the task corresponds to a code task and transmits a start container 514 instruction to container service 506. Container service 506 is configured to initiate a new container from a universal base image and then hydrate the container during the container hydration stage 516. For example, a container may access repository 510 via a retrieve request 518 to obtain the source code, dependencies, or any data used for execution.

During the initialization of the container, a boot process is executed to configure the runtime environment. The boot process initializes environment variables, sets up file system mounts, and provisions secure credentials such as API keys, authentication tokens, and other secrets used for execution. This configuration establishes a secure and reproducible environment tailored to the specific code instruction. Once the boot process completes, the fully booted and hydrated container including all environment configurations and runtime secrets is cached as a snapshot for subsequent reuse. For example, a cache container instruction 520 is provided to cache the container in container storage 508. In some aspects, caching the booted container enables future startups to bypass repetitive environment configuration to reduce overall startup latency while ensuring consistent and secure initialization across container instances. In some cases, although not shown, process 500 can include additional security precautions such as encrypting the image based on the presence of client-specific keys. In addition, the cached container images may be scoped by user or tenant access to isolate access.

Upon completion of the container hydration stage 516, the container enters inference state 522 and allows an AI model to execute the natural language instruction within the container to modify the repository. During inference state 522, task and response pairs 524 are exchanged between back end 504 and client 502 as the AI model interacts with the repository and produces coding outputs or evaluations.

When client 502 subsequently issues another code request 530, back end 504 transmits a start container 532 instruction to container service 506. Rather than performing a full setup sequence, container service 506 issues a container request 534 to container storage 508 to retrieve a previously cached container snapshot. Container storage 508 returns a hydrated container 536 that was cached by the cache container instruction 520.

The container service 506 then transitions the container directly into inference state 540, where the AI model can immediately begin executing tasks. Because the container bypasses a full hydration, startup time is reduced and enables near-instant execution of iterative or interactive development tasks. Process 500 provides substantial improvements in startup performance and resource efficiency by caching complete container snapshots. Unlike repository caching, the snapshot approach captures the full runtime environment including configuration scripts, build outputs, and installed binaries and reduces repetitive setup costs. This approach also improves determinism since containers instantiated from identical snapshots and exhibit identical behavior across runs, simplifying debugging and compliance verification.

In some aspects, the cached container snapshots may be subject to lifecycle management policies. For example, container service 506 may deprovision or invalidate snapshots after a period of inactivity to conserve storage resources, or refresh snapshots automatically when dependency changes are detected. Process 500 balances between persistence and freshness, allowing the system to maintain high performance while ensuring alignment with the latest repository state.

While process 500 significantly enhances responsiveness, it introduces certain operational challenges, such as container security. For instance, snapshot storage may use substantial capacity when multiple users maintain distinct environments. Additionally, dependency drift between cached snapshots and current repositories may still necessitate patching or rehydration steps, particularly in high-frequency development workflows.

Figure 6:
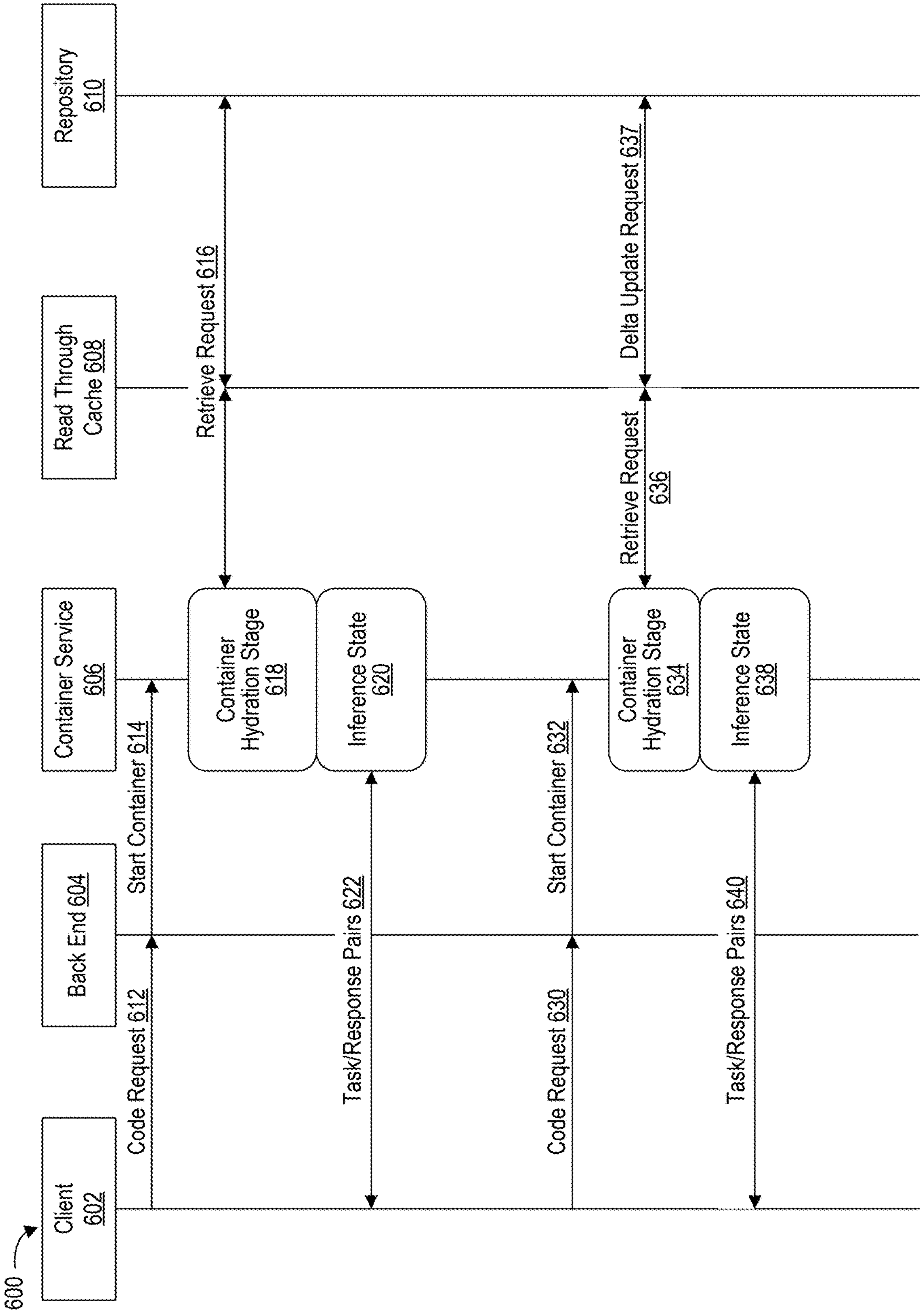
FIG. 6 illustrates a sequence diagram of a process for initializing a container using a warm cache in accordance with some aspects of the disclosure.

FIG. 6 illustrates a sequence diagram of a process 600 for initializing a container using a warm cache in accordance with some aspects of the disclosure. The system includes a client 602 (e.g., front end 210), a back end 604 (e.g., front end 210), a container service 606 (e.g., capable of spawning and controlling containers), a read through cache 608, and a repository 610 including the code to be modified or included.

In some aspects, client 602 transmits a code request 612 that includes a natural-language instruction to perform a coding or analytical task. Back end 604 classifies the request and transmits a start container 614 instruction to container service 606. Container service 606 spawns a new container and performs a container hydration stage 618. During the hydration stage 618, container service 606 issues a retrieve request 616 directed to read-through cache 608. If the requested repository data or artifacts are already present in cache 608, they are immediately returned to container service 606. If the requested data is not found, the read-through cache 608 automatically retrieves the content from repository 610 and simultaneously updates its local store, ensuring the cache remains current with the repository.

After the container has been hydrated, container service 606 transitions to an inference state 620. During inference state 620, a machine learning model interacts with the container to execute code-generation or code-evaluation tasks. Back end 604 exchanges task and response pairs 622 with client 602 to display intermediate and final results to the user.

The read-through cache 608 differs from the prior caching approaches and eliminates the explicit cache-warming or snapshotting processes. For example, in the process 400, the cache should be periodically refreshed. In the process 500, the container images are stored and retrieved as static artifacts. The read-through cache 608 dynamically and continuously synchronizes with the repository 610 at the time of access and ensures that every container start operation begins from the most recent known state without requiring explicit maintenance or warming intervals. The read-through cache 608 acts as both a data source and a proxy to the repository, maintaining a live view of repository state while reducing redundant network calls and bandwidth consumption.

For example, when client 602 subsequently issues another code request 630, back end 604 transmits a start container 632 command to container service 606. The container service 606 initiates a new container, which again performs a container hydration stage 634. During hydration, container service 606 issues a retrieve request 636 to read-through cache 608. Because read-through cache 608 maintains a copy of repository data, the container can be hydrated almost using locally cached artifacts rather than performing full network fetches. For example, as part of retrieve request 636, read-through cache 608 is configured to send a delta update request 637 to repository 610 for updates. In some aspects, read-through cache 608 may retrieve delta updates (e.g., all git patches applied to the corresponding branch repository since retrieve request 616) and then patch the repository in place (e.g., at cache 608) or provide the patches to container service 606 for patching. This enables near-instantaneous startup performance even for large repositories or frequent iterative operations. In addition, read-through cache 608 is agnostic with respect to container image and different root image containers can be deployed to allow a testing and development diversity (e.g., different operating systems, etc.).

Once the container is hydrated, container service 606 transitions to inference state 638, during which task and response pairs 640 are exchanged between back end 604 and client 602. The container may then be deprovisioned once execution completes, consistent with the ephemeral nature of the system's containers.

The process 600 provides a continuously synchronized caching layer that behaves transparently to the container service 606. Because the read-through cache 608 automatically fetches and stores new content on demand, system operators are relieved of the burden of implementing explicit warming, periodic refreshing, or manual snapshot management. In addition, this architecture minimizes latency for frequently accessed repositories, enhances reproducibility by providing consistent view states, and reduces operational cost by avoiding redundant data transfers.

In some aspects, read-through cache 608 maintains continuous synchronization with repository 610 and should carefully address concurrent writes, version conflicts, and authentication states. However, read-through cache 608 may deprovision assets based on infrequent use to prevent the maintenance of stale assets.

Figure 7:
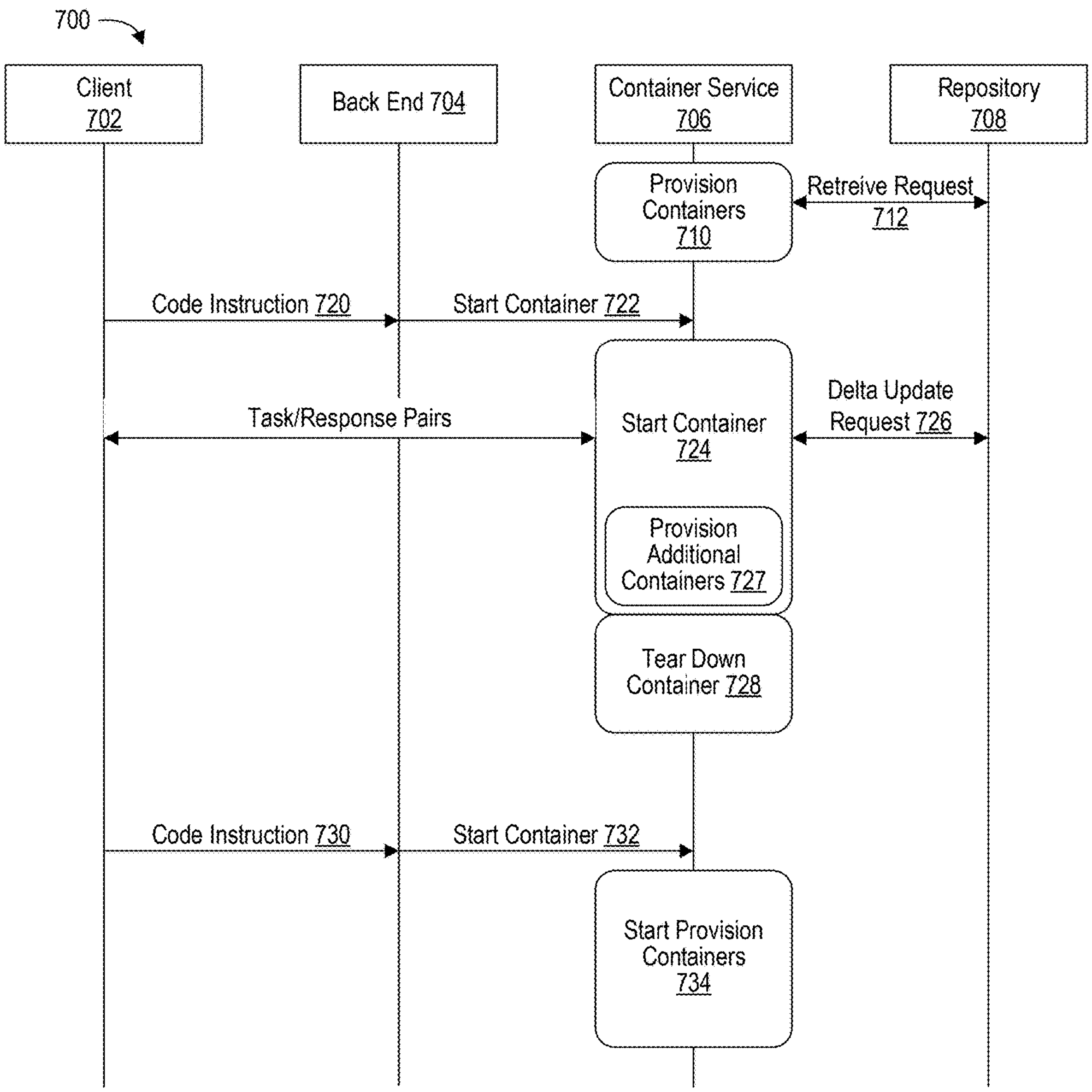
FIG. 7 illustrates a sequence diagram of a process for initializing a container using a hot container pool in accordance with some aspects of the disclosure.

FIG. 7 illustrates a sequence diagram of a process 700 for initializing a container using a hot container pool in accordance with some aspects of the disclosure. The system includes a client 702 (e.g., front end 210), a back end 704 (e.g., front end 210), a container service 706 (e.g., capable of spawning and controlling containers), and a repository 708 including the code to be modified or included.

In some aspects, container service 706 is configured to provision a plurality of containers (e.g., a container pool) at block 710. The containers pool represents a static allocation of compute instances that remain provisioned at all times to ensure immediate availability (e.g., a fixed number of containers). In other cases, the containers pool can be dynamic (e.g., adaptable based on use and time). Because the underlying datacenter reserves CPU, memory, and storage resources for the containers, the pool size is typically fixed or adjusted through administrative policy rather than on-demand scaling. This configuration differs from a dynamic orchestration model, in which containers are created or destroyed responsively to workload fluctuations. Instead, the hot-pool approach ensures that user requests can be serviced with near-zero startup latency, trading elasticity for determinism and predictable performance within the finite compute budget of the facility.

In some aspects, as part of provisioning the container pool at block 710, the container service 706 may obtain source code, environment dependencies, or configuration data from repository 708 via a retrieve request 712 to ensure the pre-provisioned containers are in a ready-to-run state. Each container within the pool may include a hydrated workspace, installed packages, and other environment-specific assets allowing it to begin processing tasks immediately upon assignment.

When client 702 issues a code instruction 720, back end 704 determines that a suitable pre-provisioned container is available and transmits a start container 722 instruction to container service 706. Container service 706 assigns a hot container from the container pool to the task and transitions it to an active state at block 724. In some aspects, as part of start container 722, container service 706 is configured to send a delta update request 726 to repository 708 for updates (e.g., when the container is network isolated, and the container may perform the delta update request 726 if network access is available). In some aspects, container service 706 (or the container) may retrieve delta updates (e.g., all git patches applied to the corresponding branch repository since retrieve request 712) and then patch the repository in the container. Because all dependencies and source assets are already present, the container can begin execution with negligible startup latency and may begin exchanging task/response pairs.

At block 727, container service 706 may include dynamically managing the container pool and provision additional container. In one non-limiting example, when a container is allocated for use, two additional containers can be allocated for a period of time, which are then deallocated if not used within varying periods of time. In other examples, a minimum number of containers can be maintained, or other type of dynamic threshold. After completion of the task at block 724, container service 706 performs a tear-down of the container. In some cases, new containers can be provisioned based on the dynamic sizing process. During this process, the completed container is deprovisioned, and a new replacement container is provisioned using a retrieve request 728 to repository 708. In this way, the container service 706 ensures that a sufficient number of hot containers remain continuously available for new incoming tasks, maintaining a desired hit-rate threshold for instantaneous startup performance.

When client 702 subsequently issues another code instruction 730, back end 704 transmits a start container 732 instruction. Container service 706 again provisions a container from the container pool at block 734, allowing immediate task execution. By continuously cycling and refreshing containers in the background, the system ensures that at least a portion of containers are within a defined freshness window, thereby minimizing perceived latency for end users. In some cases, container service 706 may be configured to deprovision the hot containers after a predetermined amount of time to maintain each container in the container pool includes a fresh copy of the repository.

The hot containers that are pre-hydrated and fully initialized and startup time is effectively eliminated for a significant percentage of requests. The user or AI model experiences an instantaneous transition into the inference environment, enabling fluid, iterative interaction for tasks that include multiple short-lived sessions. This improvement is particularly advantageous for latency-sensitive workloads such as conversational coding, real-time debugging, or incremental build validation.

In some aspects, the container service 706 is configured to dynamically adjust the number of hot containers in the pool based on workload forecasting and historical usage trends. For example, container service 706 can increase the number of active containers during peak usage hours or for specific high-frequency clients. Forecasting models may consider factors such as task frequency, code-repository size, and startup latency tolerance to optimize pool utilization and control operational costs.

Maintaining large numbers of idle yet fully provisioned containers consumes compute, memory, and storage resources even when those containers are not actively executing tasks. The system balances responsiveness with cost efficiency, employing predictive scaling algorithms to achieve target hit-rates without over-provisioning. In this way, process 700 optimizes startup by leveraging continuously refreshed, pre-provisioned container pools.

In some aspects, the different processes have benefits and costs. Process 300 establishes the foundational architecture in which containers are instantiated dynamically from a base image and hydrated directly from a source repository and provides isolation, reproducibility, and auditability, but suffers from high startup latency due to repeated full-clone operations and environment setup. Process 400 provides repository-level caching in which previously retrieved codebases are stored in a blob, database, or similar storage service. Subsequent container initializations can retrieve cached repository snapshots and perform incremental updates using patch requests. This approach significantly reduces bandwidth consumption and startup time while maintaining repository freshness through periodic refresh or delta synchronization. Process 500 caches container image snapshots at boot and is fully hydrated including installed dependencies, build outputs, and configuration state. Subsequent container instances can be launched directly from these snapshots with minimal additional setup. Process 600 provides a read-through cache architecture that maintains a live and continuously synchronized state with the source repository. When a cache miss occurs, the cache automatically retrieves the missing data from the repository and updates itself. This eliminates explicit cache management overhead, ensuring that containers initialize from a fresh, up-to-date state without compromising startup speed. Process 700 provides a hot container pool and maintains a continuously refreshed pool of pre-provisioned containers that are ready for immediate allocation. When a new task is requested, the container service assigns an already hydrated and fully configured container from the pool, effectively reducing startup latency to near zero. Containers are subsequently deprovisioned and reprovisioned in the background to sustain pool freshness and system readiness.

Figure 8:
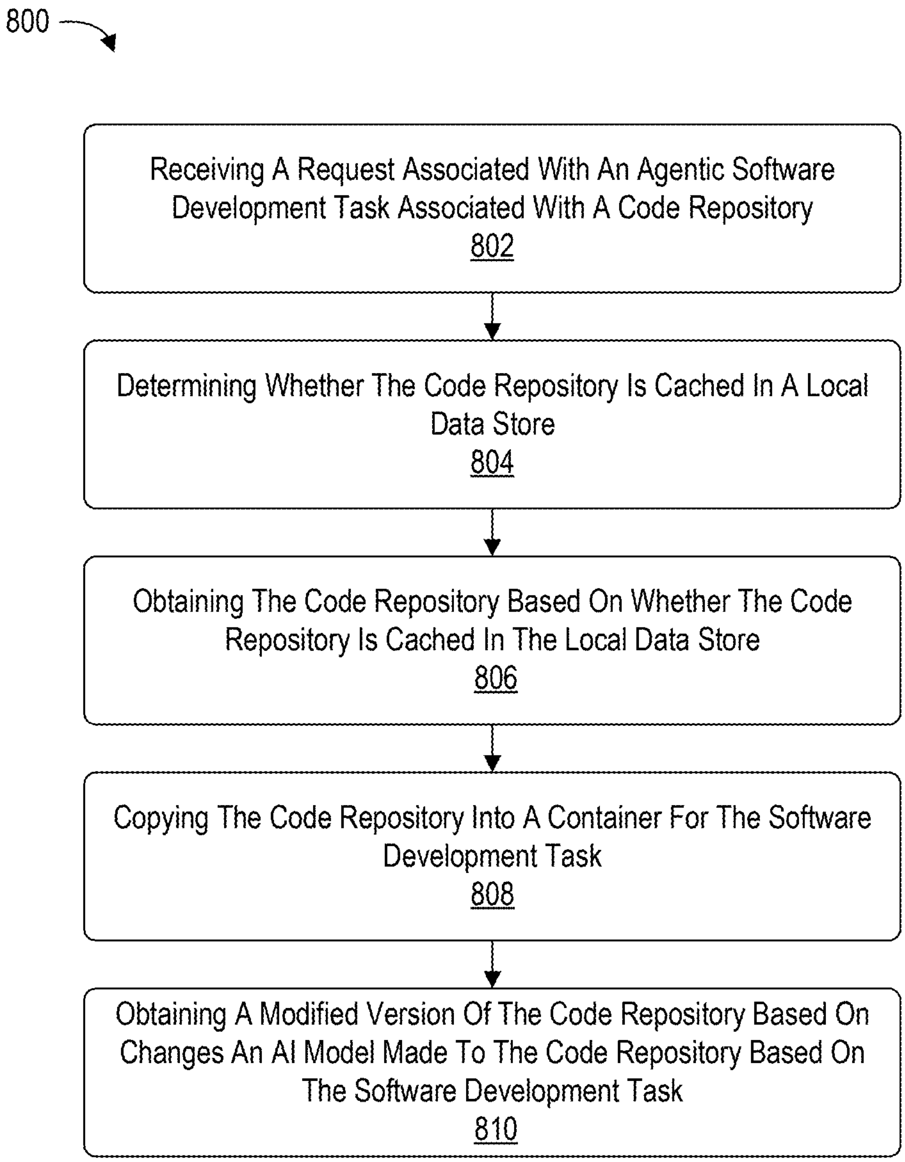
FIG. 8 illustrates a flowchart of a process for caching repositories for containerized agentic software development tasks in accordance with some aspects of the disclosure.

FIG. 8 illustrates a flowchart of a process 800 for caching repositories in containerized agentic software development tasks in accordance with some aspects of the disclosure. Process 800 (or any other described herein) can be performed by a computing device (or apparatus) or a component (e.g., one or more chipsets, a SoC, one or more processors such as one or more CPUs, GPUs, DSPs, NPUs, NSPs, microcontrollers, ASICs, FPGAs, programmable logic devices, discrete gates or transistor logic components, discrete hardware components, etc., an ML system such as a neural network model, any combination thereof, and/or other component or system) of the computing device. The operations of process 600 may be implemented as software components that are executed and run on one or more processors (e.g., CPU, GPU, DSP, NPU or neural engine, SoC, processor 1204, and/or other processor(s)).

In some aspects, the computing system may receive the instructions to perform a software development task and spawn a container based on an execution environment identified by a user configuration. The container process can include a startup configuration, which can include retrieving packages associated with a development environment associated with a repository (e.g., code repository 254). For example, the repository may be specified by a user (e.g., a GITHUB repo). In some aspects, a client device configures the user secrets using a user interface associated with a project, and the user interface can be a user interface that allows input of the software development task. The front end includes the ability to customize the execution environment, which includes specific packages, user secrets, and any other custom information that is handled deterministically.

At block 802, the computing system may receive a request associated with an agentic software development task associated with a code repository. For example, the request originates from a user interface, an AI-assisted development interface (e.g., an addin interface associated with an integrated development environment such as VSCODE) or orchestration platform that automates software engineering operations. The request may include metadata identifying the repository (e.g., a Git URL, branch name, or commit hash) and task parameters such as the programming language, build context, or desired action (e.g., refactor, test, or analyze).

The computing system may route the request to a container service configured to execute isolated development environments on demand. In some aspects, the container service provides at least one type of container and may provide the necessary runtime and toolchain context for the agentic task while maintaining reproducibility and data isolation. The orchestration layer may also include access to one or more caching subsystems, such as a read-through cache and a warm cache, to minimize repository fetch time and network load.

At block 804, the computing system may determine whether the code repository is cached in a local data store. The local data store may correspond to a cluster-local blob storage service or a specialized caching layer that maintains previously fetched repository snapshots.

In one aspect, a read-through cache may maintain a continuously updated mirror of repositories previously accessed by any agent. This mirror lazily synchronizes new commits whenever a cache miss occurs, ensuring freshness without requiring explicit warm-up cycles. In another aspect, a warm cache embodiment proactively refreshes repositories at scheduled intervals, such as every few hours, to ensure that subsequent container startups use incremental updates. Determining whether a repository is cached may involve a key-value lookup, directory existence check, or metadata query (e.g., a HEAD comparison) to verify whether a valid cached object exists and whether it is within an acceptable staleness threshold.

At block 806, the computing system may obtain the code repository based on whether the code repository is cached in the local data store. For example, if the repository is present and valid in the cache, the computing system may hydrate a working copy directly from the local storage, minimizing network overhead. Otherwise, the computing system may fetch the repository from a remote repository service, such as GitHub, GitLab, or an enterprise-hosted version control system. For cache hits, the read-through cache may serve compressed Git packfiles or pre-materialized directory trees, mounted via overlay file systems for rapid access. For cache misses, the system may first populate the local cache by cloning the repository and writing commit objects into the data store for reuse. This dual-path logic ensures low latency for frequent repositories while maintaining correctness for rarely used or newly created ones.

In some aspects, the computing system may retrieve commits to the code repository based on a difference between a cached version of the code repository in the local data store and a current version stored in a repository service. The retrieval of the code can be implemented using standard Git synchronization protocols (e.g., git fetch or git pull) that compare object graphs between the cached repository and the remote. The computing system may maintain a persistent HEAD reference or commit index that tracks the last synchronized state. When differences are detected, only the new or modified commit objects are retrieved, significantly reducing network transfer.

In another aspect, the computing system may apply the commits to the cached version of the code repository to correspond to the current version stored in the repository service. For example, the computing system ensures that the cached copy remains consistent with the canonical repository while preserving prior commit history and branch structure. The application of commits may involve a fast-forward merge or a rebase operation, depending on repository configuration. The update process may be atomic, such that containers relying on the cache see either the old or the new state.

At block 808, the computing system may copy the code repository into a container for the software development task. For example, the container may be instantiated from a universal base image that includes a minimal runtime environment and agentic task runner. The code repository is mounted or copied into the container's working directory. In some cases, when the repository is hydrated from a cache, the system may use container image snapshots (e.g., by creating a lightweight file system layer that references a previously captured snapshot of the repository's state, minimizing I/O duplication). The container's file system may be pre-populated with dependency caches or build artifacts, further reducing cold-start latency. This operation may also include verifying that file permissions, commit metadata, and environment configurations are correctly mapped into the container. In environments supporting content-addressable storage, the copy operation can be replaced with a symbolic layer mount that references the cached repository directly without duplicating bytes on disk.

At block 810, the computing system may obtain a modified version of the code repository based on changes an AI model made to the code repository based on the software development task. During execution, an AI model (e.g., a large language model specialized for code generation) may interact with the repository to edit, add, or refactor files according to the assigned task. The container includes an agentic runtime that monitors file system changes or commit operations generated by the AI. Once modifications are complete, the orchestration system captures the resulting repository state as a modified version.

This modified repository may be exported as a differential patch (git diff) or as a full snapshot for archival or further caching. In some aspects, the computing system may include a user interface to promulgate the differential patch to the repository (e.g., as a pull request). For example, in a read-through cache, the patch ensures that future requests for the same repository automatically benefit from the latest modifications without redundant pulls from the upstream service.

In some aspects, the computing system may refresh the code repository from a repository service based on a timer expiring. For example, a warm cache is configured to refresh repositories periodically refreshed even without user requests. A scheduler may issue refresh commands every 6 or 12 hours to update repositories whose cached copies exceed a staleness threshold. This guarantees that cached data remains within a bounded temporal delta (e.g., commits no older than 6 or 12 hours).

In other aspects, the computing system may retrieve and cache a current version of the code repository from a repository service in response to the request. In some examples, the computing system may capture an image of the container after the container has started an entrypoint of the container (or just before the entrypoint). In this case, the image may be used for a subsequent software development task and because the image has loaded dependencies, binaries, or compiling intermediate artifacts, the computing captures a persistent image layer representing that ready-to-use state. This image may be stored in a local registry and reused in subsequent processes, such as when another task by the same user (or different user) is requested after a period of time.

Figure 9:
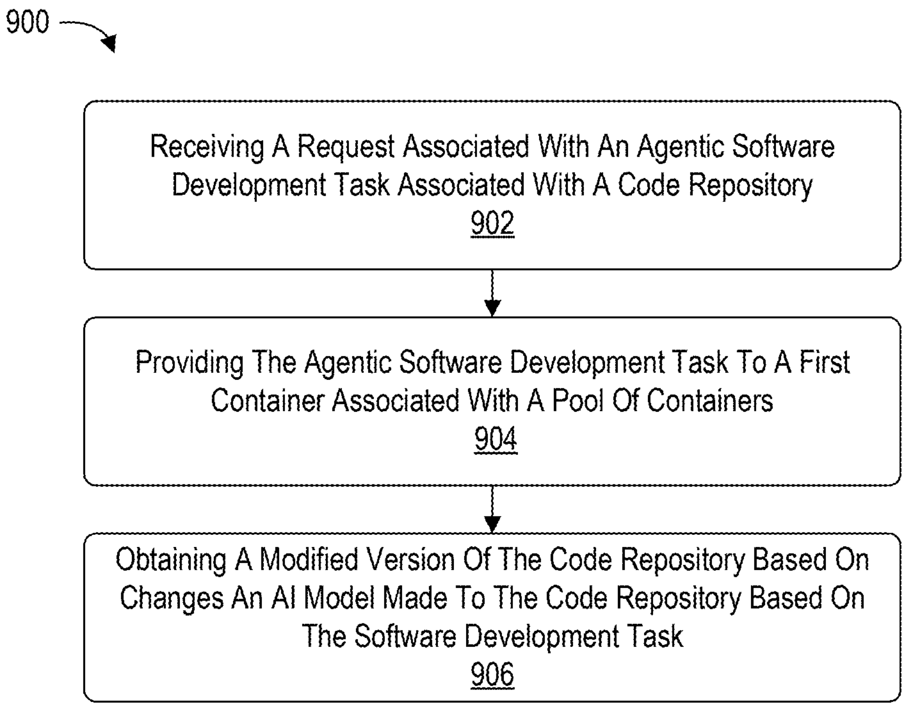
FIG. 9 illustrates a flowchart of a process for caching repositories for containerized agentic software development tasks in accordance with some aspects of the disclosure.

FIG. 9 illustrates a flowchart of a process 900 for caching repositories in containerized agentic software development tasks in accordance with some aspects of the disclosure. Process 900 (or any other described herein) can be performed by a computing device (or apparatus) or a component (e.g., one or more chipsets, a SoC, one or more processors such as one or more CPUs, GPUs, DSPs, NPUs, NSPs, microcontrollers, ASICs, FPGAs, programmable logic devices, discrete gates or transistor logic components, discrete hardware components, etc., an ML system such as a neural network model, any combination thereof, and/or other component or system) of the computing device. The operations of process 600 may be implemented as software components that are executed and run on one or more processors (e.g., CPU, GPU, DSP, NPU or neural engine, SoC, processor 1204, and/or other processor(s)).

In some aspects, the process described below relates to a process of starting a container, and includes various blocks and additional operations described below. For example, the computing device may execute a system startup script associated with a system configuration, and the system startup script includes an instruction to execute a user startup script defined by a user as part of process 900. For example, the user startup script is merged (e.g., using a string interpolation) with the system startup script. The user startup script is executed before an instruction in the system startup script to disable the external network interface. The startup script may be injected into the container during an initialization command (e.g., docker run).

In some aspects, the computing system may receive the instructions to perform a software development task and spawn a container based on an execution environment identified by a user configuration. The container process can include a startup configuration, which can include retrieving packages associated with a development environment associated with a repository (e.g., code repository 254). For example, the repository may be specified by a user (e.g., a GITHUB repo). In some aspects, a client device configures the user secrets using a user interface associated with a project, and the user interface can be a user interface that allows input of the software development task. The front end includes the ability to customize the execution environment, which includes specific packages, user secrets, and any other custom information that is handled deterministically.

At block 902, the computing system may receive a request associated with an agentic software development task associated with a code repository. In some aspects, the request may originate from a task orchestration layer that manages agentic development workflows. In other examples, the request may be from a client device (e.g., a front end app, an extension associated with an integrated development environment, etc.).

At block 904, the computing system may provide the agentic software development task to a first container associated with a pool of containers. A respective container in the pool of containers includes a cached version of the code repository. The pool of containers may be a hot pool or a pre-provisioned set of containers that are maintained in a ready state at all times to enable near-instant task startup. A container in the pool may execute a lightweight supervisory process that idles while awaiting assignment.

Every container in the pool may include a cached copy of one or more code repositories relevant to a specific customer, project, or organization. The cached repositories may be synchronized periodically from a remote repository service or hydrated from a local read-through cache. The container pool may be managed by a container service or orchestration controller that continuously monitors pool health, replacing aged containers and pre-warming replacements. The pool size may be static or dynamically adjusted based on predicted workload intensity using historical request patterns. For example, the controller may forecast that a particular customer typically uses ten concurrent containers and maintains a hot pool of ten pre-initialized instances.

When a new agentic task is received, the scheduler selects the first available container from the pool whose cached repository version satisfies staleness and configuration criteria. The orchestration system may then bind the task context, user credentials, and AI model session endpoint to that container. Because the environment is already preloaded, startup latency can drop from several seconds to sub-second response times.

At block 906, the computing system may obtain a modified version of the code repository based on changes an AI model made to the code repository based on the software development task. Once the selected container begins execution, an AI model performs the requested software development operation. The model may write code edits, add new files, or modify configuration parameters within the repository. The modifications are tracked by a monitoring service inside the container that observes filesystem changes or intercepts git commands executed by the agent runtime. When the AI model completes the task, the orchestration layer captures a modified repository version. This may be represented as a commit patch or full snapshot, depending on the system's configuration. The modified repository may be exported back to the remote repository service, or optionally stored in a post-task cache to seed future hot-pool containers.

Figure 10:
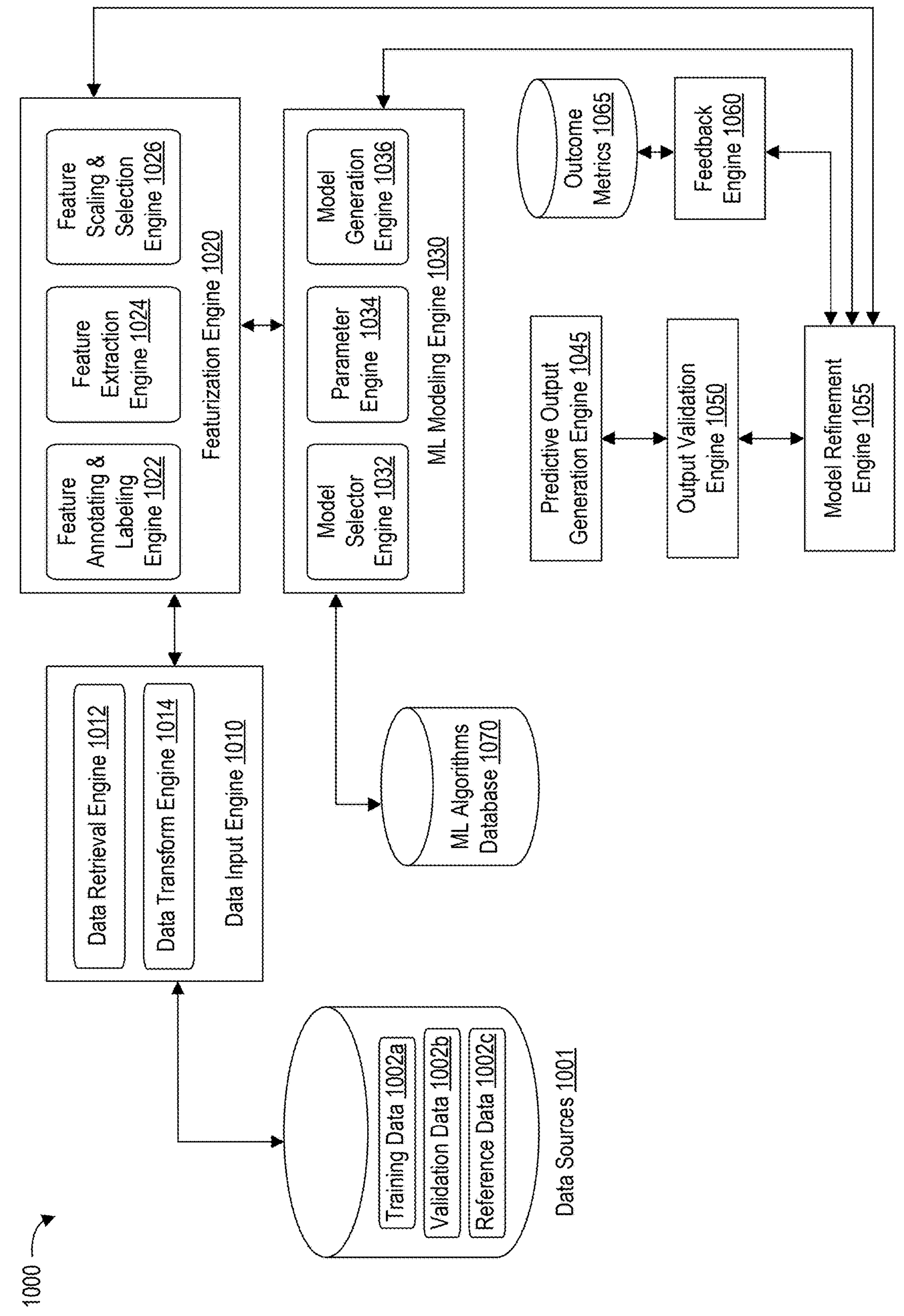
FIG. 10 is a block diagram illustrating an example machine-learning platform in accordance with some aspects of the disclosure.

FIG. 10 is a block diagram illustrating an example machine learning platform for implementing various aspects of this disclosure in accordance with some aspects of the present technology. Although the example system depicts particular system components and an arrangement of such components, this depiction is to facilitate a discussion of the present technology and should not be considered limiting unless specified in the appended claims. For example, some components that are illustrated as separate can be combined with other components, and some components can be divided into separate components.

System 1000 may include data input engine 1010 that can further include data retrieval engine 1012 and data transform engine 1014. Data retrieval engine 1012 may be configured to access, interpret, request, or receive data, which may be adjusted, reformatted, or changed (e.g., to be interpretable by another engine, such as data input engine 1010). For example, data retrieval engine 1012 may request data from a remote source using an API. Data input engine 1010 may be configured to access, interpret, request, format, re-format, or receive input data from data sources(s) 1001. For example, data input engine 1010 may be configured to use data transform engine 1014 to execute a re-configuration or other change to data, such as a data dimension reduction. In some aspects, data sources(s) 1001 may be associated with a single entity (e.g., organization) or with multiple entities. Data sources(s) 1001 may include one or more of training data 1002*a* (e.g., input data to feed a machine learning model as part of one or more training processes), validation data 1002*b* (e.g., data against which at least one processor may compare model output with, such as to determine model output quality), and/or reference data 1002*c*. In some aspects, data input engine 1010 can be implemented using at least one computing device. For example, data from data sources(s) 1001 can be obtained through one or more I/O devices and/or network interfaces. Further, the data may be stored (e.g., during execution of one or more operations) in a suitable storage or system memory. Data input engine 1010 may also be configured to interact with a data storage, which may be implemented on a computing device that stores data in storage or system memory.

System 1000 may include featurization engine 1020. Featurization engine 1020 may include feature annotating & labeling engine 1022 (e.g., configured to annotate or label features from a model or data, which may be extracted by feature extraction engine 1024), feature extraction engine 1024 (e.g., configured to extract one or more features from a model or data), and/or feature scaling & selection engine 1026 Feature scaling & selection engine 1026 may be configured to determine, select, limit, constrain, concatenate, or define features (e.g., AI features) for use with AI models.

System 1000 may also include ML modeling engine 1030, which may be configured to execute one or more operations on a machine learning model (e.g., model training, model re-configuration, model validation, model testing), such as those described in the processes described herein. For example, ML modeling engine 1030 may execute an operation to train a machine learning model, such as adding, removing, or modifying a model parameter. Training of a machine learning model may be supervised, semi-supervised, or unsupervised. In some aspects, training of a machine learning model may include multiple epochs, or passes of data (e.g., training data 1002*a*) through a machine learning model process (e.g., a training process). In some aspects, different epochs may have different degrees of supervision (e.g., supervised, semi-supervised, or unsupervised). Data into a model to train the model may include input data (e.g., as described above) and/or data previously output from a model (e.g., forming a recursive learning feedback). A model parameter may include one or more of a seed value, a model node, a model layer, an algorithm, a function, a model connection (e.g., between other model parameters or between models), a model constraint, or any other digital component influencing the output of a model. A model connection may include or represent a relationship between model parameters and/or models, which may be dependent or interdependent, hierarchical, and/or static or dynamic. The combination and configuration of the model parameters and relationships between model parameters discussed herein are cognitively infeasible for the human mind to maintain or use. Without limiting the disclosed aspects in any way, a machine learning model may include millions, billions, or even trillions of model parameters. ML modeling engine 1030 may include model selector engine 1032 (e.g., configured to select a model from among a plurality of models, such as based on input data), parameter engine 1034 (e.g., configured to add, remove, and/or change one or more parameters of a model), and/or model generation engine 1036 (e.g., configured to generate one or more machine learning models, such as according to model input data, model output data, comparison data, and/or validation data).

In some aspects, model selector engine 1032 may be configured to receive input and/or transmit output to ML algorithms database 1070. Similarly, featurization engine 1020 can utilize storage or system memory for storing data and can utilize one or more I/O devices or network interfaces for transmitting or receiving data. ML algorithms database 1070 may store one or more machine learning models, any of which may be fully trained, partially trained, or untrained. A machine learning model may be or include, without limitation, one or more of (e.g., such as in the case of a metamodel) a statistical model, an algorithm, a neural network (NN), a convolutional neural network (CNN), a generative neural network (GNN), a Word2Vec model, a bag of words model, a term frequency-inverse document frequency (tf-idf) model, a GPT (Generative Pre-trained Transformer) model (or other autoregressive model), a diffusion model, a diffusion-transformer model, an encoder such as BERT (Bidirectional Encoder Representations from Transformers) or LXMERT (Learning Cross-Modality Encoder Representations from Transformers), a Proximal Policy Optimization (PPO) model, a nearest neighbor model (e.g., k nearest neighbor model), a linear regression model, a k-means clustering model, a Q-Learning model, a Temporal Difference (TD) model, a Deep Adversarial Network model, or any other type of model described further herein. Some of the ML algorithms in ML algorithms database 1070 can be considered generative response engines. Generative response engines are those models are commonly referred to as Generative AI, and that can receive an input prompt and generate additional content based on the prompt. GPTs, diffusion models, and diffusion-transformer models are some non-limiting examples of generative response engines. Some specific examples of generative response engines that can be stored in the ML algorithms database 1070 include versions DALL E, CHAT GPT, and SORA, all provided by OPEN AI.

System 1000 can further include predictive output generation engine 1045 and output validation engine 1050 (e.g., configured to apply validation data to machine learning model output). Predictive output generation engine 1045 can analyze the input and identify relevant patterns and associations in the data it has learned to generate a sequence of words that predictive output generation engine 1045 predicts is the most likely continuation of the input using one or more models from the ML algorithms database 1070, aiming to provide a coherent and contextually relevant answer. Predictive output generation engine 1045 generates responses by sampling from the probability distribution of possible words and sequences, guided by the patterns observed during its training. In some aspects, predictive output generation engine 1045 can generate multiple possible responses before presenting the final one. Predictive output generation engine 1045 can generate multiple responses based on the input, and these responses are variations that predictive output generation engine 1045 considers potentially relevant and coherent. Output validation engine 1050 can evaluate these generated responses based on certain criteria. These criteria can include relevance to the prompt, coherence, fluency, and sometimes adherence to specific guidelines or rules, depending on the application. Based on this evaluation, output validation engine 1050 selects the most appropriate response. This selection is typically the one that scores highest on the set criteria, balancing factors like relevance, informativeness, and coherence.

System 1000 can further include feedback engine 1060 (e.g., configured to apply feedback from a user and/or machine to a model) and model refinement engine 1055 (e.g., configured to update or re-configure a model). In some aspects, feedback engine 1060 may receive input and/or transmit output (e.g., output from a trained, partially trained, or untrained model) to outcome metrics database 1065. Outcome metrics database 1065 may be configured to store output from one or more models and may also be configured to associate output with one or more models. In some aspects, outcome metrics database 1065, or other device (e.g., model refinement engine 1055 or feedback engine 1060), may be configured to correlate output, detect trends in output data, and/or infer a change to input or model parameters to cause a particular model output or type of model output. In some aspects, model refinement engine 1055 may receive output from predictive output generation engine 1045 or output validation engine 1050. In some aspects, model refinement engine 1055 may transmit the received output to featurization engine 1020 or ML modeling engine 1030 in one or more iterative cycles.

The engines of system 1000 may be packaged functional hardware units designed for use with other components or a part of a program that performs a particular function (e.g., of related functions). Any or each of these modules may be implemented using a computing device. In some aspects, the functionality of system 1000 may be split across multiple computing devices to allow for distributed processing of the data, which may improve output speed and reduce computational load on individual devices. In some aspects, system 1000 may use load-balancing to maintain stable resource load (e.g., processing load, memory load, or bandwidth load) across multiple computing devices and to reduce the risk of a computing device or connection becoming overloaded. In these or other aspects, the different components may communicate over one or more I/O devices and/or network interfaces.

System 1000 can be related to different domains or fields of use. Descriptions of aspects related to specific domains, such as natural language processing or language modeling, are not intended to limit the disclosed aspects to those specific domains, and aspects consistent with the present disclosure can apply to any domain that utilizes predictive modeling based on available data.

Figure 11A:
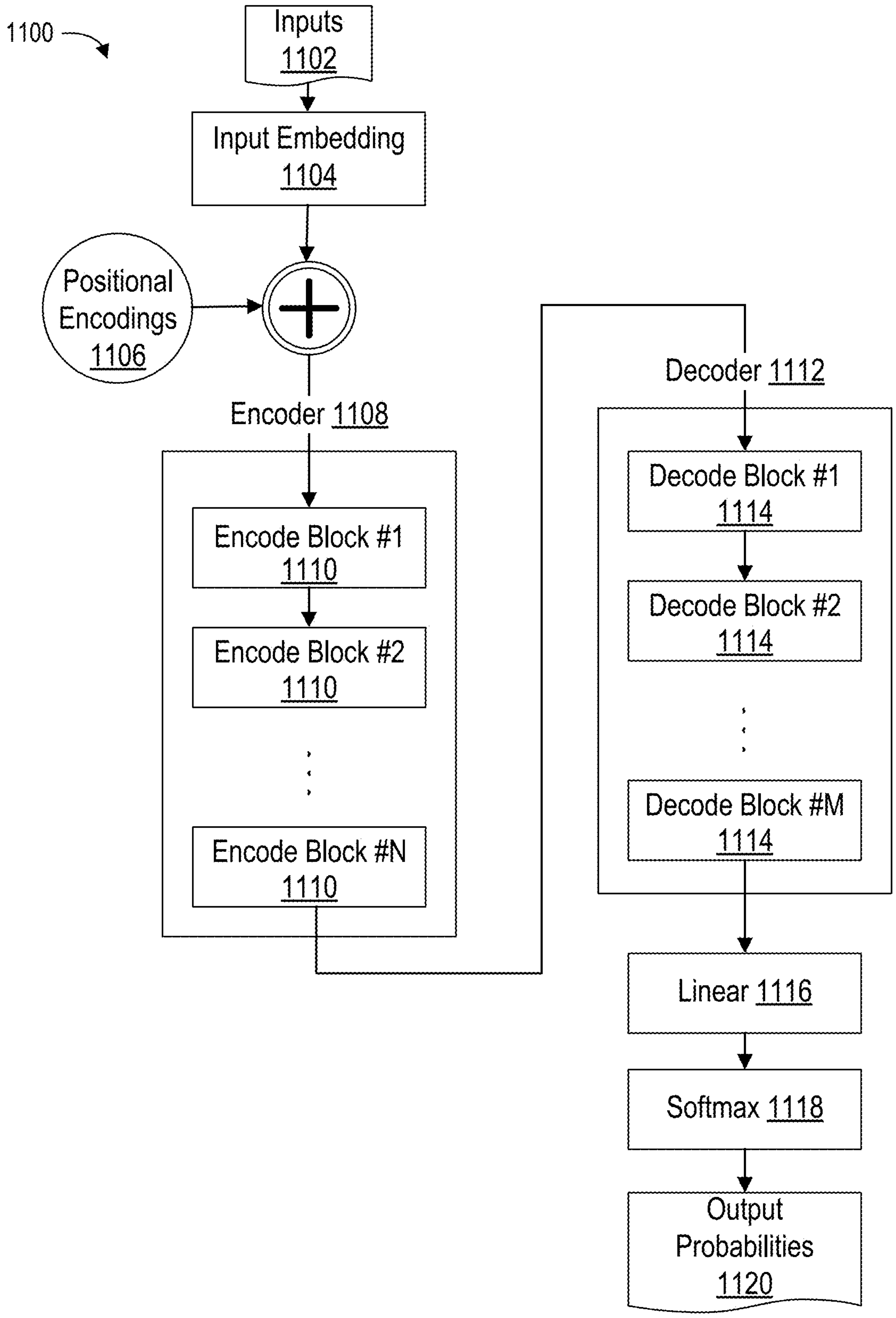
FIGS. 11A, FIG. 11B, and FIG. 11C illustrate an example transformer architecture in accordance with some aspects of the disclosure.
Figure 11B:
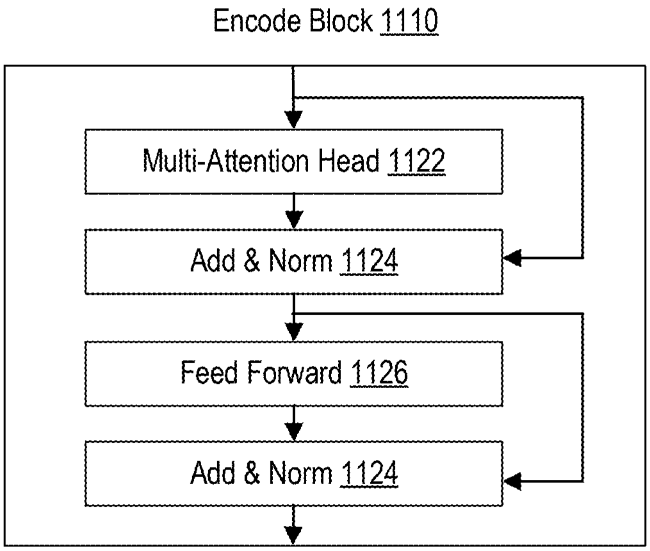
Figure 11C:
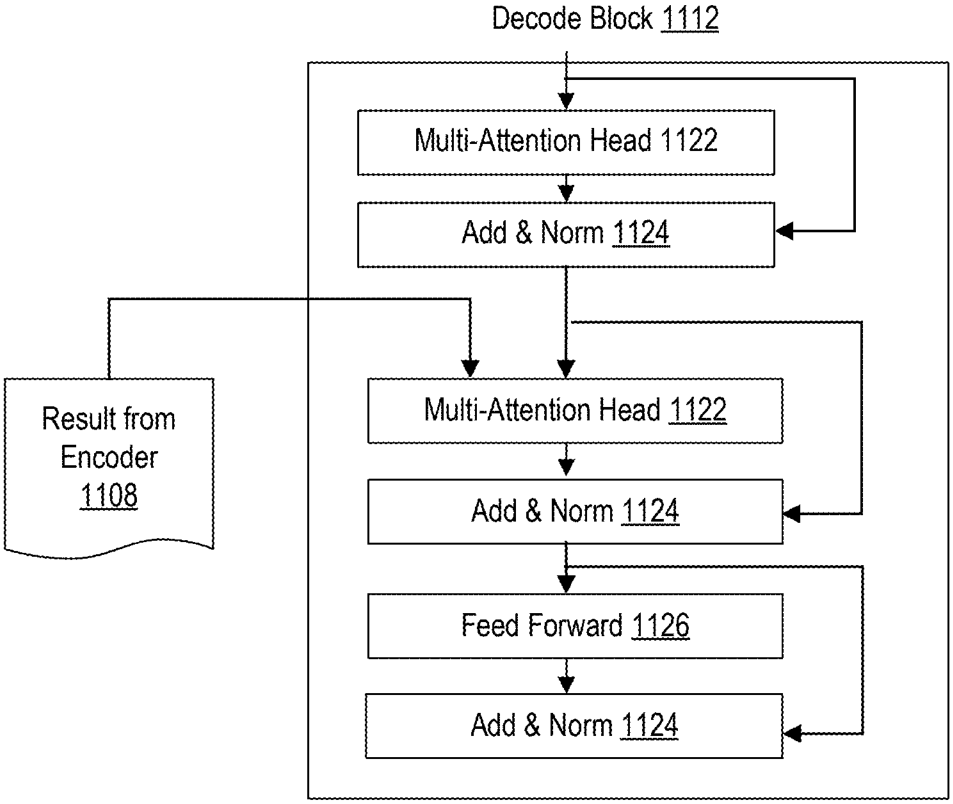

FIG. 11A, FIG. 11B, and FIG. 11C illustrates an example transformer architecture in accordance with some aspects of the present technology. Examples of ML models that use a transformer neural network (e.g., transformer architecture 1100) can include, e.g., generative pretrained transformer (GPT) models and Bidirectional Encoder Representations from Transformer (BERT) models. The transformer architecture 1100, which is illustrated in FIG. 11A, FIG. 11B, and FIG. 11C, includes inputs 1102, input embedding block 1104, positional encodings 1106, encoder 1108 including encode blocks 1110, decoder 1112 including decode blocks 1114, linear block 1116, softmax block 1118, and output probabilities 1120.

Input embedding block 1104 is used to provide representations for words. For example, embedding can be used in text analysis. According to certain non-limiting examples, the representation is a real-valued vector that encodes the meaning of the word in such a way that words that are closer in the vector space are expected to be similar in meaning. Word embeddings can be obtained using language modeling and feature learning techniques, where words or phrases from the vocabulary are mapped to vectors of real numbers. According to certain non-limiting examples, the input embedding block 1104 can be learned embeddings to convert the input tokens and output tokens to vectors of dimension that have the same dimension as the positional encodings, for example.

Positional encodings 1106 provide information about the relative or absolute position of the tokens in the sequence. According to certain non-limiting examples, positional encodings 1106 can be provided by adding positional encodings to the input embeddings at the inputs to the encoder 1108 and decoder 1112. The positional encodings have the same dimension as the embeddings, thereby enabling a summing of the embeddings with the positional encodings. There are several ways to realize the positional encodings, including learned and fixed. For example, sine and cosine functions having different frequencies can be used. That is, each dimension of the positional encoding corresponds to a sinusoid. Other techniques of conveying positional information can also be used, as would be understood by a person of ordinary skill in the art. For example, learned positional embeddings can instead be used to obtain similar results. An advantage of using sinusoidal positional encodings rather than learned positional encodings is that doing so allows the model to extrapolate to sequence lengths longer than the ones encountered during training.

Encoder 1108 can use stacked self-attention and point-wise, fully connected layers. Encoder 1108 can be a stack of N identical layers (e.g., N=6), and each layer can be an encode block, as illustrated by encode block 1110 shown in FIG. 11B. Each encode block 1110 has two sub-layers: (i) a first sub-layer has a multi-head attention block 1122 and (ii) a second sub-layer has a feed forward block 1126, which can be a position-wise fully connected feed-forward network. The feed forward block 1126 can use a rectified linear unit (ReLU).

Encoder 1108 uses a residual connection around each of the two sub-layers, followed by an add & norm block 1124, which performs normalization. For example, the output of each sub-layer can be LayerNorm(x+Sublayer(x)). To facilitate these residual connections, all sub-layers in the model, as well as the embedding layers, produce output data having a same dimension.

Similar to encoder 1108, decoder 1112 uses stacked self-attention and point-wise, fully connected layers. Decoder 1112 can also be a stack of M identical layers (e.g., M=6), and each layer can be a decode block, as illustrated by decoder 1112 shown in FIG. 11B. In addition to the two sub-layers (i.e., the sublayer with multi-head attention block 1122 and the sub-layer with feed forward block 1126) found in encode block 1110, decode block 1114 can include a third sub-layer, which performs multi-head attention over the output of the encoder stack. Similar to encoder 1108, decoder 1112 uses residual connections around each of the sub-layers, followed by layer normalization. Additionally, the sub-layer with multi-head attention block 1122 can be modified in the decoder stack to prevent positions from attending to subsequent positions. This masking, combined with the fact that the output embeddings are offset by one position, can ensure that the predictions for position i can depend only on the known output data at positions less than i.

Linear block 1116 can be a learned linear transformation. For example, when transformer architecture 1100 is being used to translate from a first language into a second language, linear block 1116 can project the output from the last decode softmax block 1118 into word scores for the second language (e.g., a score value for each unique word in the target vocabulary) at each position in the sentence. For instance, if the output sentence has seven words and the provided vocabulary for the second language has 10,000 unique words, then 10,000 score values are generated for each of those seven words. The score values indicate the likelihood of occurrence for each word in the vocabulary in that position of the sentence.

Softmax block 1118 then turns the scores from linear block 1116 into output probabilities 1120 (which add up to 1.0). In each position, the index provides for the word with the highest probability, and then maps that index to the corresponding word in the vocabulary. Those words then form the output sequence of transformer architecture 1100. The softmax operation is applied to the output from linear block 1116 to convert the raw numbers into output probabilities 1120 (e.g., token probabilities).

Figure 12:
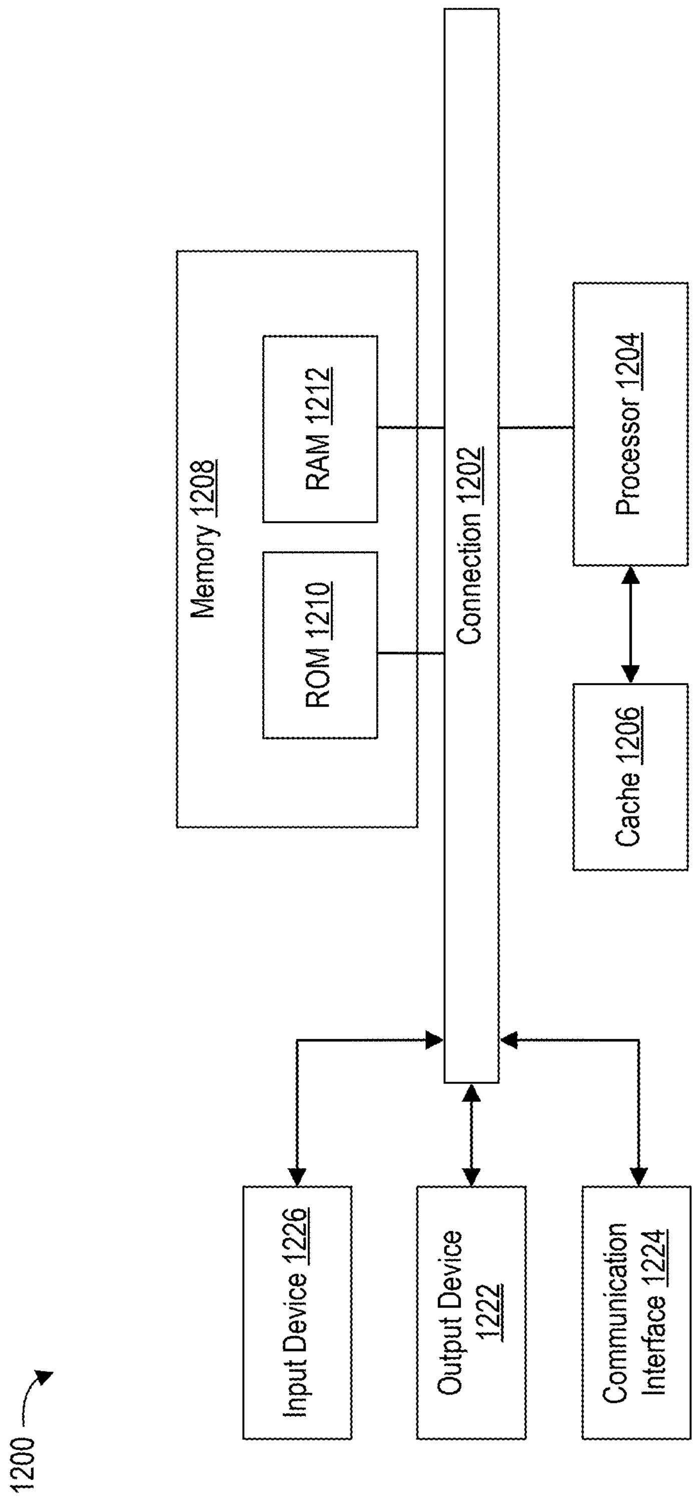
FIG. 12 shows an example of a system for implementing some aspects of the present technology.

FIG. 12 shows an example of computing system 1200, which can be, for example, any computing device making up any engine illustrated in FIG. 1 or any component thereof.

In some aspects, computing system 1200 is a single device, or a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

In some aspects, computing system 1200 may comprise one or more computing resources provisioned from a "cloud computing" provider, For example, AMAZON ELASTIC COMPUTE CLOUD ("AMAZON EC2"), provided by AMAZON, INC. of Seattle, Washington; SUN CLOUD COMPUTER UTILITY, provided by SUN MICROSYSTEMS, INC. of Santa Clara, California; AZURE, provided by MICROSOFT CORPORATION of Redmond, Washington, GOOGLE CLOUD PLATFORM, provided by ALPHABET, INC. of Mountain View, California, and the like.

Example computing system 1200 includes at least one processing unit (CPU or processor) 1204 and connection 1202 that couples various system components including system memory 1208, such as read-only memory (ROM) 1210 and random access memory (RAM) 1212 to processor 1204. Memory 1208 can be a volatile or non-volatile memory device, and can be a hard disk or other types of non-transitory computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

Memory 1208 can include software services, servers, logic, etc., that when the code that defines such software is executed by the processor 1204, it causes the system to perform a function. In some aspects, a hardware service that performs a particular function can include the software component stored in a computer-readable medium in connection with the necessary hardware components, such as processor 1204, connection 1202, output device 1222, etc., to carry out the function.

Computing system 1200 can include a cache of high-speed memory 1206 connected directly with, in close proximity to, or integrated as part of processor 1204.

Connection 1202 can be a physical connection via a bus, or a direct connection into processor 1204, such as in a chipset architecture. Connection 1202 can also be a virtual connection, networked connection, or logical connection.

Processor 1204 can include any general purpose processor and a hardware service or software service stored in memory 1208, configured to control processor 1204 as well as a special-purpose processor where software instructions are incorporated into the actual processor design. Processor 1204 may essentially be a completely self-contained computing system, containing multiple cores or processors, a bus, memory controller, cache, etc. A multi-core processor may be symmetric or asymmetric. Processor 1204 can be physical or virtual.

To enable user interaction, computing system 1200 includes an input device 1226, which can represent any number of input mechanisms, such as a microphone for speech, a touch-sensitive screen for gesture or graphical input, keyboard, mouse, motion input, speech, etc. Computing system 1200 can also include output device 1222, which can be one or more of a number of output mechanisms known to those of skill in the art. In some instances, multimodal systems can enable a user to provide multiple types of input/output to communicate with computing system 1200. Computing system 1200 can include communication interface 1224, which can generally govern and manage the user input and system output. There is no restriction on operating on any particular hardware arrangement, and therefore the basic features here may easily be substituted for improved hardware or firmware arrangements as they are developed.

In some aspects, computing system 1200 can refer to a combination of a personal computing device interacting with components hosted in a data center, where both the computing device and the components in the data center. In such examples, both the personal computing device and the components in the datacenter might have a processor, cache, memory, storage, etc.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, For example, instructions and data which cause or otherwise configure a general purpose computer, special purpose computer, or special purpose processing device to perform a certain function or group of functions. Portions of computer resources used can be accessible over a network. The executable computer instructions may be, For example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

What is claimed is:

1. A method comprising:

receiving a request associated with an agentic software development task associated with a code repository;

determining whether the code repository is cached in a local data store;

obtaining the code repository based on whether the code repository is cached in the local data store;

copying the code repository into a container for the agentic software development task; and obtaining a modified version of the code repository from the container, wherein an AI model changes the code repository during the agentic software development task.

2. The method of claim 1, further comprising:

retrieving commits to the code repository based on a difference between a cached version of the code repository in the local data store and a current version stored in a repository service.

3. The method of claim 2, further comprising:

applying the commits to the cached version of the code repository to correspond to the current version stored in the repository service.

4. The method of claim 1, further comprising:

based on a timer expiring, refreshing the code repository from a repository service.

5. The method of claim 1, further comprising:

in response to the request, retrieving and caching a current version of the code repository from a repository service.

6. The method of claim 1, further comprising:

capturing an image of the container at an entrypoint of the container, wherein the image is used for a subsequent software development task.

7. The method of claim 1, wherein determining whether the code repository is cached in the local data store comprises:

determining a time difference between a current time and a caching time of the code repository in the local data store; and refreshing the code repository based on the time difference.

8. The method of claim 1, further comprising:

retrieving delta updates from the code repository and patching a cached version of the code repository with the delta updates.

9. A method, comprising:

receiving a request associated with an agentic software development task associated with a code repository;

providing the agentic software development task to a first container associated with a pool of containers, wherein each respective container in the pool of containers includes a cached version of the code repository; and obtaining a modified version of the code repository from the first container, wherein an AI model changes the code repository during the agentic software development task.

10. The method of claim 9, further comprising:

in response to the request, retrieving delta updates from the code repository and patching the cached version of the code repository with the delta updates.

11. A computing device, comprising:

at least one memory; and at least one processor coupled to the at least one memory and configured to:

receive a request associated with an agentic software development task associated with a code repository;

determine whether the code repository is cached in a local data store;

obtain the code repository based on whether the code repository is cached in the local data store;

copy the code repository into a container for the agentic software development task; and obtain a modified version of the code repository from the container, wherein an AI model changes the code repository during the agentic software development task.

12. The computing device of claim 11, wherein the at least one processor is configured to:

retrieve commits to the code repository based on a difference between a cached version of the code repository in the local data store and a current version stored in a repository service.

13. The computing device of claim 12, wherein the at least one processor is configured to:

apply the commits to the cached version of the code repository to correspond to the current version stored in the repository service.

14. The computing device of claim 11, wherein the at least one processor is configured to:

based on a timer expiring, refresh the code repository from a repository service.

15. The computing device of claim 11, wherein the at least one processor is configured to:

in response to the request, retrieve and cache a current version of the code repository from a repository service.

16. The computing device of claim 11, wherein the at least one processor is configured to:

capture an image of the container at an entrypoint of the container, wherein the image is used for a subsequent software development task.

17. The computing device of claim 11, wherein the at least one processor is configured to:

determine a time difference between a current time and a caching time of the code repository in the local data store; and refresh the code repository based on the time difference.

18. The computing device of claim 11, wherein the at least one processor is configured to:

retrieve delta updates from the code repository and patch a cached version of the code repository with the delta updates.

19. A computing device, comprising:

at least one memory; and at least one processor coupled to the at least one memory and configured to:

receive a request associated with an agentic software development task associated with a code repository;

obtain a container image for a container from a local data store, the container image including the code repository; and obtain a modified version of the code repository from the container, wherein an AI model changes the code repository during the agentic software development task.

20. The computing device of claim 19, further comprising:

in response to the request, retrieve delta updates from the code repository and patch a cached version of the code repository with the delta updates.

* * * * *